United States Patent [19]
Gilliland et al.

[11] Patent Number: 5,798,627
[45] Date of Patent: Aug. 25, 1998

[54] METHOD FOR SIMULTANEOUS OPERATION OF ROBOT WELDERS

[76] Inventors: Malcolm T. Gilliland, 310 Pine Valley Rd., Marietta, Ga. 30067; Kenneth Alan Gilliland, 2131 McKinley Rd., Atlanta, Ga. 30318

[21] Appl. No.: 368,705

[22] Filed: Jan. 4, 1995

[51] Int. Cl.$^6$ .................................................. G06F 9/00
[52] U.S. Cl. ........................ 318/568.14; 318/568.13; 364/461; 395/90; 901/4
[58] Field of Search ..................... 395/90, 94, 135, 395/83, 80; 364/424.02, 474.2, 424.01, 413.02, 461, 460, 518, 521–523; 318/568.12, 568.16, 568.14, 568.24, 568.13, 568.1; 901/1, 3, 4, 5, 8, 15, 19

[56] References Cited

U.S. PATENT DOCUMENTS

| | | | |
|---|---|---|---|
| 4,890,241 | 12/1989 | Hoffman et al. | 364/513 |
| 4,910,859 | 3/1990 | Holcomb | 29/564.2 |
| 4,994,979 | 2/1991 | Bruder et al. | 364/474.09 |
| 5,150,452 | 9/1992 | Pollack et al. | 395/90 |
| 5,159,248 | 10/1992 | Megherbi | 318/568.1 |
| 5,161,936 | 11/1992 | Kato | 414/728 |
| 5,204,942 | 4/1993 | Otera et al. | 395/83 |
| 5,315,517 | 5/1994 | Kawase et al. | 365/424.02 |
| 5,323,470 | 6/1994 | Kara et al. | 395/94 |
| 5,485,389 | 1/1996 | Terada et al. | 364/474.2 |
| 5,499,320 | 3/1996 | Backes et al. | 395/95 |

*Primary Examiner*—John W. Cabeca
*Attorney, Agent, or Firm*—Jones & Askew

[57] ABSTRACT

A method for preventing collisions between robots by causing a first robot to stop or pause so that a second robot may safely pass by or perform a specified operation. Once the second robot has completed its operation then the first robot is allowed to resume operation. Each robot automatically stops when it reaches a certain point in its job. The robots communicate with a central controller which allows the robots to resume operation when the central controller has determined that all of the robots have reached their respective correct positions. This prevents collisions between robots which are operating in the same area, especially those robots operating on the same workpiece. This method works with existing robot welders, does not require modifications to the robots, and does not require expensive spatial analysis computer programs, which may not even be available for the type of processor used in a particular robot. The peformance of two or more heat generating operations, such as welding operations, can cause excessive heating of an object if the operations are performed closely together in time or space. That excessive heating can result in distortion of the object. The present invention prevents excessive heating and subsequent distortion of the object by changing the sequence of the operations.

17 Claims, 10 Drawing Sheets

Fig_1

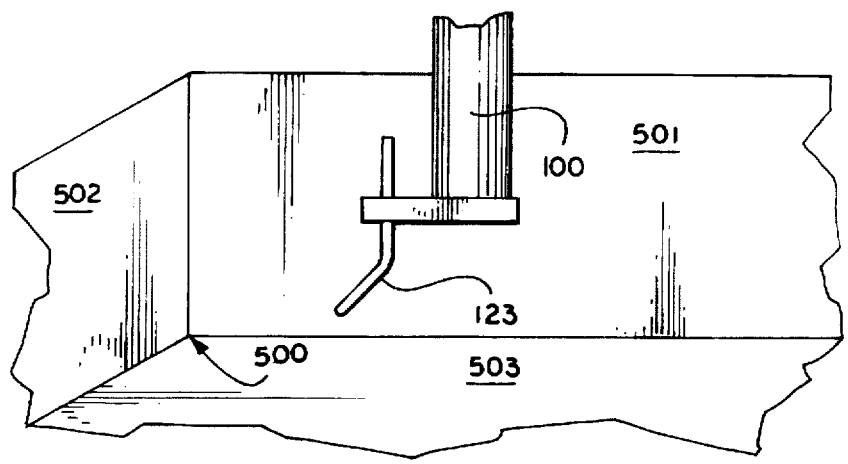
Fig_5
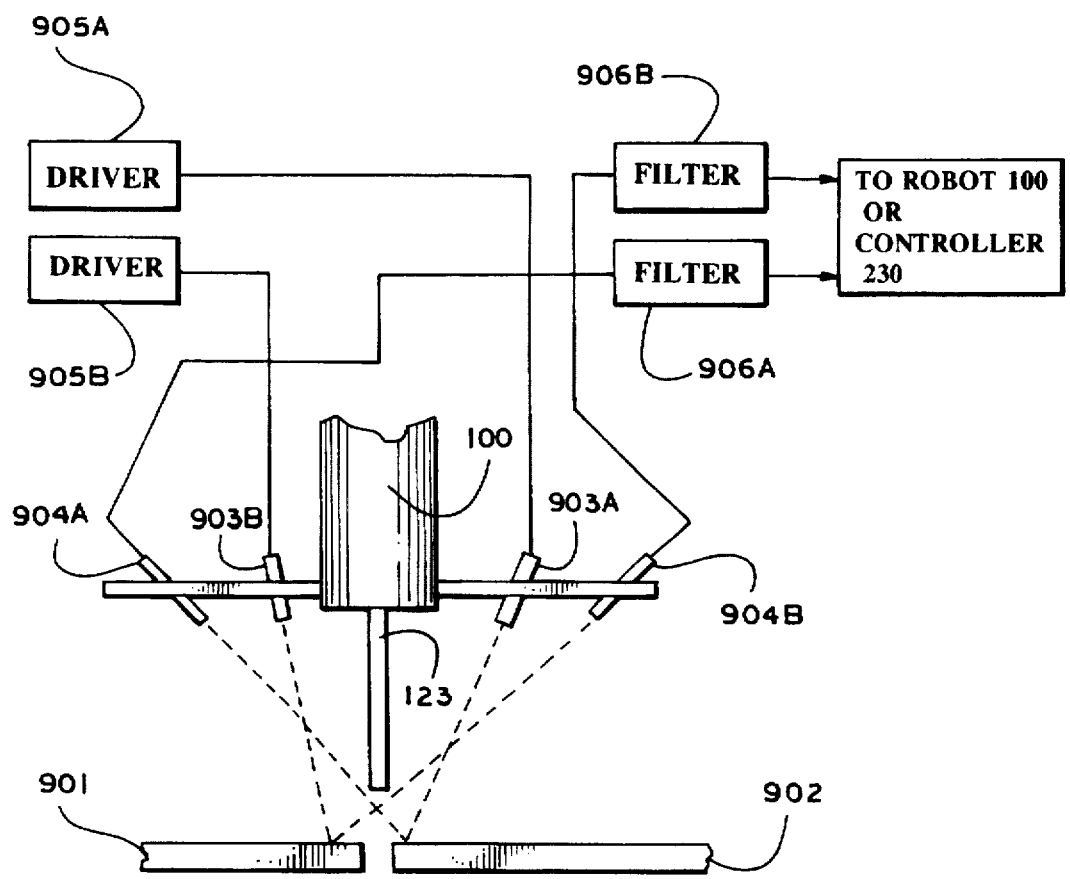
Fig_9

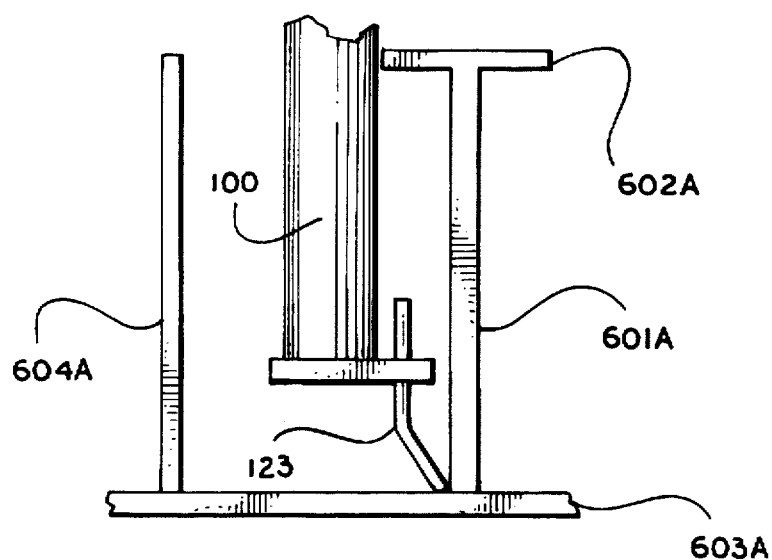
Fig_6A
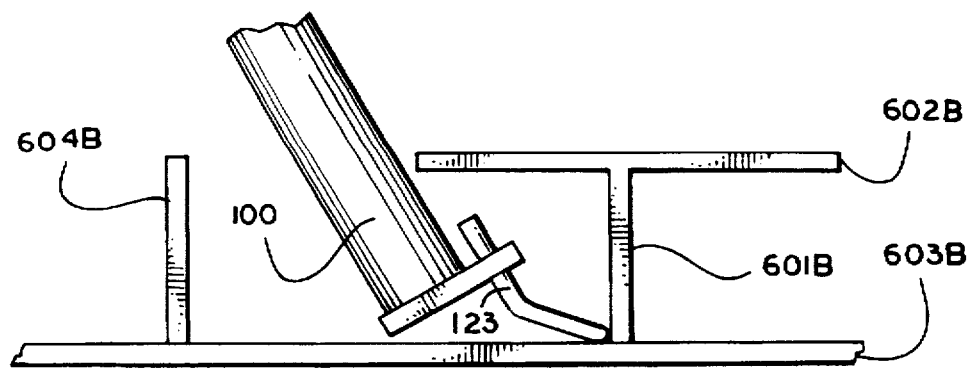
Fig_6B

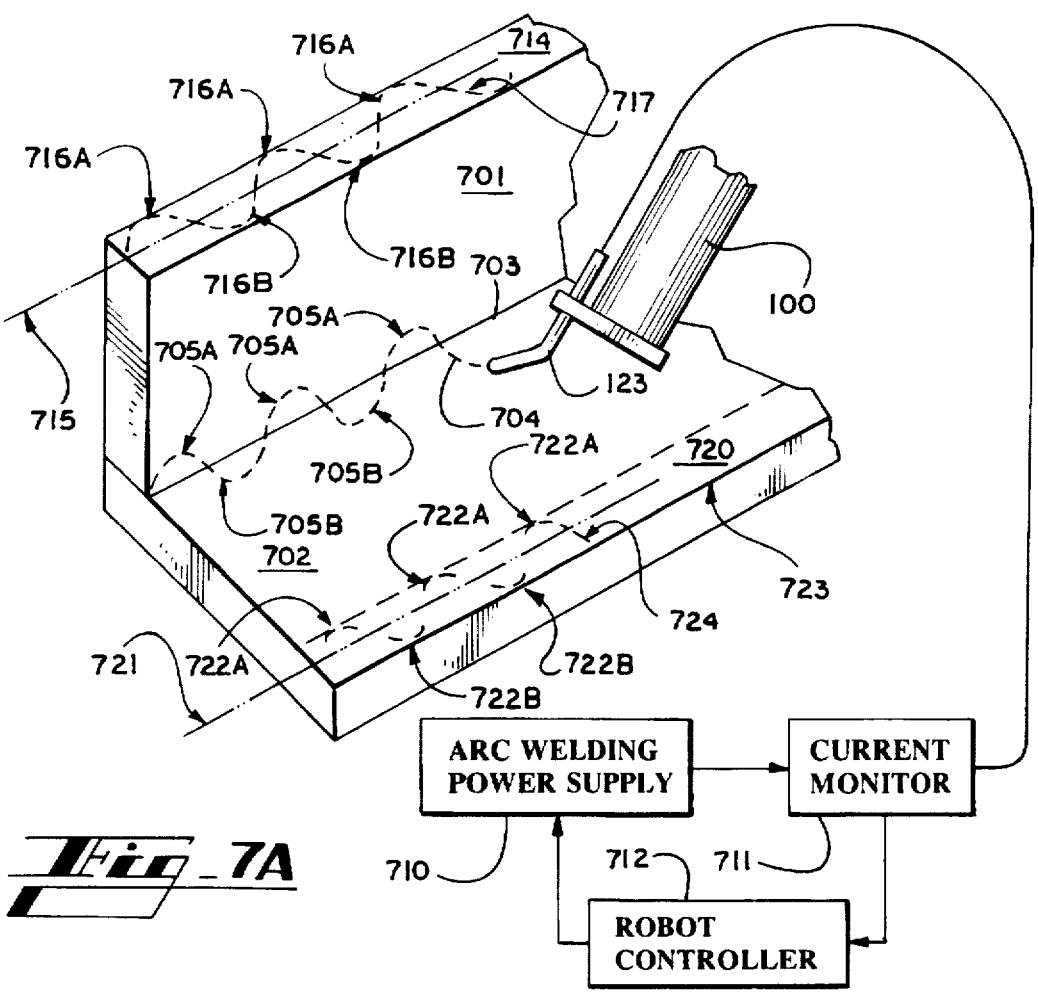
Fig. 7A
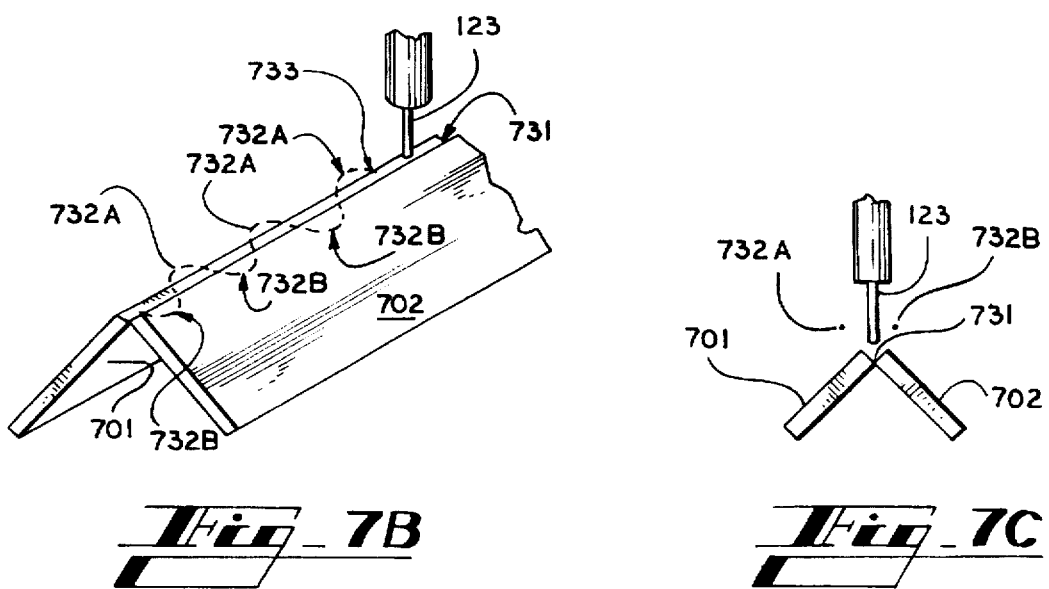
Fig. 7B
Fig. 7C

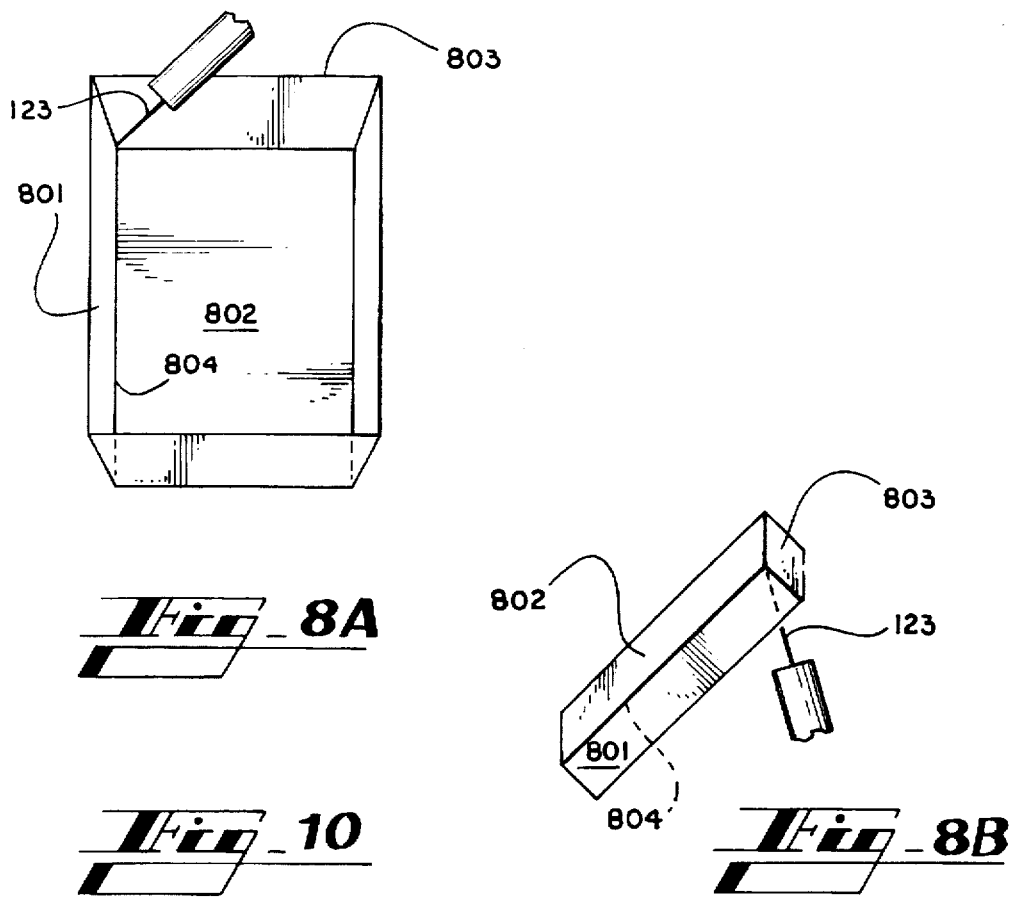
*Fig_8A*
*Fig_10*          *Fig_8B*
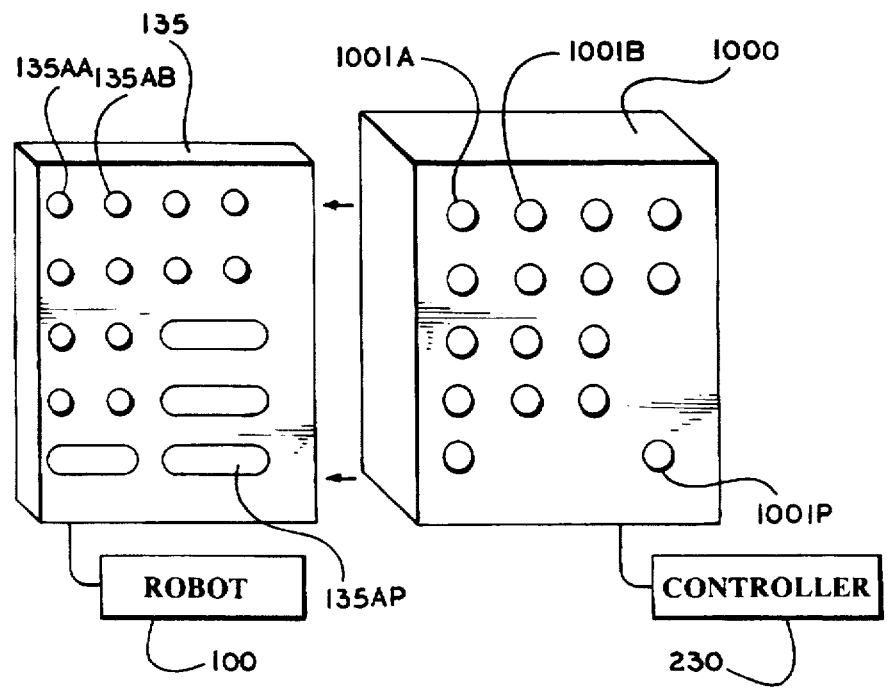

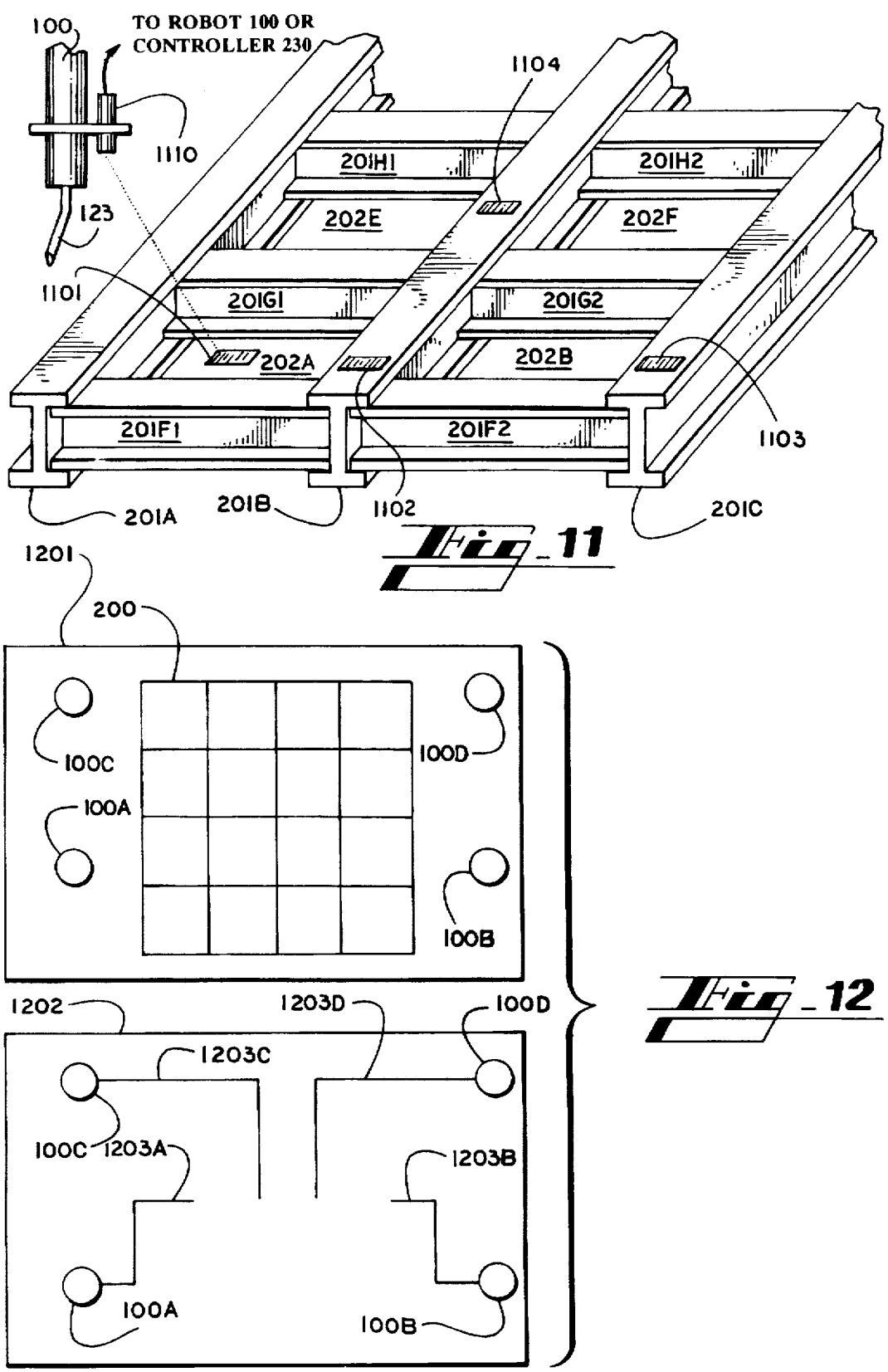

METHOD FOR SIMULTANEOUS OPERATION OF ROBOT WELDERS

TECHNICAL FIELD

This invention relates to automated (robot) welding systems and, more particularly, is for methods for simultaneously operating robot welders on the same workpiece so as to avoid collisions between the robot welders, for automatically determining how a weld is to be performed, for automatically keeping the weld on the desired path, and for automatically selecting a welding program based upon the particulars of the components.

BACKGROUND OF THE INVENTION

Robot welders are automated welding machines which operate under the control of a microprocessor. They are being used in more and more applications because they provide several advantages with respect to human welders. Some, but not all, of the advantages are that they do not need to take breaks, they can tolerate adverse environmental conditions, they can work in very tight areas, and they yield a consistent, quality weld.

However, a robot, like a human, must be told what to weld. A program for a robot welder can be written which specifies the exact spot or line that must be welded. Typically, an operator specifies the starting point of a weld and the length of the weld or the ending point of the weld. This information is given in precise coordinates, for example, start at point x=1.05 inches, y=1.77 inches, and z=0.0 inches and end at x=2.00 inches, y=2.00 inches, and z=0.5 inches. In this case the robot will weld on a seam defined by a line between the given starting and ending points. This procedure is simple and straightforward, but is very time consuming because the operator must determine the starting and ending points of the weld. This procedure is also prone to errors because the operator must manually enter these starting and ending points into the program and the operator may make errors in measuring the points or in entering the points into the program. Further, some points may be difficult or impossible for the operator to measure manually.

The robots have sensing devices, often referred to as touch sensors, which indicate that contact has been made with an object. In welding environments, the workpiece is typically a conductive material, such as iron or steel. Therefore, in these environments, the touch sensor is often the tip of the welding torch, or the welding wire, and the robot senses when the tip or wire has reached the workpiece by simply monitoring the output voltage or current at the tip or wire. When contact is made, the output voltage will drop and the output current will increase. The operator can therefore operate the robot to determine the coordinates of the starting and ending points of the weld, and then enter these coordinates into a welding program. This procedure is simple and straightforward, but is also very time consuming and prone to errors because, even though the robot makes the measurements precisely, the operator may make errors in entering the measurements.

Thus, each weld requires a substantial amount of attention by the operator. In some cases, the amount of time required to determine the coordinates of the weld and enter the points into the welding program can easily exceed the amount of time required for the robot to perform the weld. Also, because of human measurement and data entry, errors are quite possible. Therefore, there is a need for a method of operating a robot welder so as to reduce or eliminate the amount of attention required from the operator.

Further, once a welding program is written it will generally be useful for only one specified weld. That is, as long as the coordinates of the welds are identical (same starting and ending points), then the robot will faithfully repeat the weld. This is most useful on assembly lines where the robot performs the same welding operation on each workpiece which comes down the assembly line. However, if the coordinates of the welds are not identical then a different program is required. This may occur where one robot is required to make several welds on the same workpiece. Thus, the amount of memory required to store the several programs necessary for multiple welding operations can be substantial or even beyond the capability of the robot.

Robot welders, although useful, do only what the programmer instructs them to do. This is of little concern if there is only one robot performing a welding operation because, other than hitting the workpiece, there is little danger of the robot hitting anything. However, speed of assembly is frequently a customer requirement so it would be beneficial if two or more robots could be assigned to weld on the same workpiece at the same time. The problem with two or more robot welders is that they may try to occupy the same space at the same time. Two humans assigned to perform conflicting welding operations may be able to discuss and resolve the problem among themselves. They may also contact a supervisor to determine whose work will be done first. However, robots do not have the capability to recognize that a problem exists, much less discuss and resolve the problem or seek the guidance of a superior authority. Therefore, each robot follows its own program, mindless of the presence of any other robot. The result at some point, with some programs, will be a collision. The resulting damage to the robots and possibly even the workpiece can be extensive and expensive, and can cause serious delays.

It is difficult, if not impossible, to know in advance of the performance of an operation whether or not there will be a collision between the two robots. When programming a robot to perform a welding operation, the operator may specify a series of points to which the robot must move, with or without specifying exactly how the robot will get there. However, the microprocessor which controls the robot has its own set of manufacturer-installed operating instructions as to how the robot should operate. This problem is compounded by the fact that a robot typically has numerous degrees of freedom. For example, the Panasonic industrial robot model AW-010A has 6 degrees of freedom (rotation, upper arm, front arm, rotating wrist, bending wrist, twisting wrist), and two directions of linear motion (forward-backward, up-down). The particular moves generated by these operating instructions are frequently not the same moves, or in the same sequence, that the operator would have thought to use to accomplish the same result. Therefore, even if the operator specifies that a robot is to go from one point to another point, the operator has no information on what motions the robot may implement to do so. Further, the operator may have to particularly specify parts of the sequence to get the welding torch in the right position and at the right angle while avoiding parts of the workpiece, for example, an overhanging flange from a T-beam.

This problem is made worse if one attempts to simultaneously operate more than one robot on the same workpiece. None of the robots knows, or has the capability to know, where the other robots are located, what the other robots are doing, what the other robots are preparing to do, or how the other robots are going to accomplish whatever their next actions may be. Therefore, in the past, the only certain ways to avoid a collision were to put only a single robot on a workpiece, or to space the robots far enough apart to where it was impossible for one robot to intrude into the operating area of another robot. However, a single robot provides for slow operation. Further, in some situations, the small size of the workpiece may prevent spacing the robots such that they cannot hit each other. Also, operating space is like any other resource; it has a value and should be conserved whenever possible. There is therefore a need for a method which provides for simultaneous operation of the robots in close proximity to each other while preventing the collisions which, with the current state of the art, are probable.

A sophisticated spatial analysis computer program could be used to generate a computer model of each robot and the workpiece and perform a mathematical computation to determine if any robot will attempt to occupy the same space as any other robot at the same time. However, such a program is expensive and requires a substantial amount of time for programming of the dimensions and variables. Such a program is also very computation-intensive and requires a large amount of memory. This may tie up the resources of a company which has its own computer, or increase the computer time rental costs for a company. Furthermore, a spatial analysis program may not have been written for the particular processor being used to control a robot. In addition, there may be inadequate time, at a processing speed which is not cost prohibitive, to perform the calculations in real time. Also, any change to any program may require running the analysis again to verify that the change has not caused a collision.

Welding robots typically have current sensors associated with each driving motor. Therefore, if the robot contacts an object and a driving motor stalls out, then the current will increase. This feature is often referred to as an amp-out condition and can be used to determine if the robot has hit an object or another robot. However, at the speeds at which robots operate, the damage will still be serious. It is, of course, possible to program the robots to move at a very slow rate so that the amp-out condition can be used to determine if a collision is occurring and to stop movement of the robots so that the collision will not cause further damage. However, this only prevents further damage, it does not prevent any damage caused by the initial contact nor resolve the original problem: both robots trying to be in the same space at the same time. Also, by moving at this slow speed, the time needed for a welding operation is greatly increased. Further, the slow movement approach is only useful for positioning. A welding operation must usually occur at a predetermined speed. Moving the robot arm at a slower speed during a welding operation may result in the workpiece being damaged by excessive heat. The workpiece may be warped or even burned through, or an excessively large welding bead may be deposited. Therefore, there is a need for a method of operating robot welders in a manner which avoids collisions between the robots.

Before beginning a welding operation, the robot must know how to get the torch into the compartment in which the welding operation is to be performed. This can be done by the operator, by manually measuring the coordinates, or by manually positioning the robot in the compartment. However, manual measurement of the coordinates is time prone to errors, and manual positioning is time consuming. In many cases, the workpiece is designed using a computer aided design (CAD) program. This CAD program contains information which could be used to determine the entry point into a compartment for the torch. This would eliminate the need for manual measurement or control, would improve speed, and would eliminate errors. Therefore, there is a need for a method for specifying a compartment entry point for a welding operation based upon data provided from a CAD program.

Even after the torch is guided into the compartment in which a welding operation is to be performed, the starting and ending points of the weld must be determined. This can be done by the operator, by manually measuring the coordinates, or by manually positioning the torch to determine the coordinates, and then loading these coordinates into the robot. However, these procedures are time consuming and may introduce errors. Some robots have a "touch-sensing" capability. That is, the ability to locate the boundaries or walls which limit the operation area of the robot. This capability could be used to define the coordinates of the weld. Therefore, there is a need for a method for automatically determining the starting and ending coordinates of a weld. There is also a need for a method for automatically determining the starting and ending coordinates of a weld using the touch-sensing capability of the robot.

Programming a robot by going out on the shop floor and using a pendant to teach the robot the steps necessary for the welding operation is useful, but is time consuming and, therefore, inefficient and expensive. Further, it requires the operator to go into an environment which is not climate controlled. If the weather is particularly adverse then the time that the operator can spend on the shop floor may be very limited. To circumvent this problem, some facilities use programmers to write the welding program by looking at the CAD design, rather than by going out on the shop floor. The programmer is thus in a climate-controlled environment and is not affected by the weather. However, this approach is often unsuccessful on the first attempt at programming. This occurs because there are limits on the agility of a robot. The robot may be able to turn its wrist through most of, all of, or even slightly more than, a 360 degree arc but there will be a limit. This limit condition is installed in the robot by the manufacturer and prevents excessive turning so that wires, hoses, and cables do not get wrapped around the robot arm and/or broken. If this limit is implemented by software it is frequently referred to as a soft limit condition and if it is implemented by hardware, such as a switch, it is frequently referred to as a hard limit condition. If a program instructs the robot to move more than the soft limit condition allows, the soft/hard limit causes the robot to disregard the program instruction. A programmer may unknowingly write a program which attempts to cause the robot to exceed a limit condition. When the offending program instruction is reached then the robot simply stops operating. The programmer may have to run the program several times to determine why the robot stopped. Then, the programmer will have to modify or completely rewrite the program in order to avoid reaching the limit switch condition. In some cases, the programmer may have to modify or rewrite the program by going out on the shop floor and using the pendant. There is therefore a need for a method of generating a welding program which avoids the limit switch problem and which also prevents the operator from having to go to the shop floor for the programming.

Before the welding operation is performed, the angle of attack of the torch of the robot must be specified. There is an optimum angle of attack for most welding operations. However, merely specifying that angle in the welding job for a robot is not useful because the compartment in which the welding is to be done may be too deep, or have a beam with too much of a flange overhang, to obtain the desired angle of attack and the robot may merely jam the torch into the workpiece in a vain attempt to achieve the desired angle of attack. Therefore, there is a need for a method for automatically determining the positioning of a torch to provide for an optimum angle of attack for a welding operation.

Further, the optimum angle of attack for the torch is not fixed, even for a known compartment design. If the orientation (pitch or roll) of the compartment is changed then the optimum angle of attack for the torch will vary to compensate for the tendency of the molten metal to flow downhill. Also, if one takes the program for a compartment which has no pitch (inclination) and tries to use the program for a compartment which has some pitch, the robot may be able to get into position to start the weld but may encounter a limit condition as the robot attempts to perform the weld. Thus, a different orientation (yaw, pitch, roll) may require the robot to use a different approach path in order to get the torch into the compartment and be able to complete the weld. Therefore, there is a need for a method for generating a program which is responsive to the orientation of the workpiece.

Once the robot has successfully placed the torch within the desired compartment and the torch is positioned at the best available angle of attack, the robot must move the torch along the joint of the pieces to be welded together. Point-to-point specifications are very useful if the joint is along a straight line. However, if the joint is along a curve or bend, or there is a change in the direction of the joint, then point-to-point specifications become less useful. Attempting to create a curve by a series of point-to-point specifications is time consuming and also prone to errors because the ending point of one path must precisely correspond to the starting point of the next path. Also, if the curve is severe, then numerous point-to-point specifications may be necessary to simulate the curve closely enough to keep the torch on the joint. There exists a method for automatically tracking the joint for a welding seam where the seam is a joint between two planar surfaces. However, in some cases, the weld to be made is not a joint between two planar surfaces but is a joint between two perpendicular surfaces. The prior art seam tracking method frequently fails to provide the desired results in the case of perpendicular surfaces. Therefore, there is a need for a method for automatically tracking the seam between two perpendicular surfaces.

In some cases, the weld to be made is not a joint between two surfaces but, rather, is simply a welding bead placed along the edge of a piece to eliminate the rough edge, or provide for rust prevention, or provide a better edge for a later welding operation, etc. As in the case of a seam, point-to-point specifications are very useful if the edge is a straight line. However, if the edge is curved or bent, or there is a change in the direction of the edge, then point-to-point specifications become less useful. Attempting to create a curve by a series of point-to-point specifications is time consuming and also prone to errors because the ending point of one path must precisely correspond to the starting point of the next path. Also, if the curve is severe, then numerous point-to-point specifications may be necessary to simulate the curve closely enough to keep the torch on the edge. Therefore, there is a need for a method for automatically tracking the edge of a component so that a welding bead can be applied to the edge.

SUMMARY OF THE INVENTION

The present invention provides a method whereby collisions between robots are avoided. In the present invention the operator instructs each robot, in the above-described conventional manner and using the control pendant for that robot, what welding operation is to be performed and, to the extent necessary, how the robot is to position itself to perform the welding operation. Preferably, this is done for the compartment which is the smallest, or is the most difficult for the robot to get into and/or to position itself for the operation. For example, a weld may be performed in an area which is under the flange of a T-beam. A particular sequence of moves may be required to get the torch past the flange and into position at the right angle. The operator then causes the robot to store this sequence of moves as its job. This procedure is performed for one robot at a time. The operator then uses the pendants to cause the robots to begin "single step" execution of the programs. Single-step execution means that a robot will perform one command of the program and then stop until permission is given to perform the next command of the program. In the preferred embodiment, the operator gives a robot permission to execute the next command by pressing a key on the control pendant for that particular robot.

The operator then watches the robots step through their respective jobs. At each stopping point (completion of the execution of a command in the job) the operator decides whether any robots are heading for a collision. This is a judgment call based upon the experience of the operator. In the preferred embodiment, a collision is deemed possible if any robots will pass within three or four inches of each other. This is a conservative figure and smaller distances are acceptable. If a collision will not occur then the programs are satisfactory at that point. However, if the operator determines that a collision may occur then the operator determines if the collision can be avoided by, for example, letting robot A complete the next command, or even a series of commands, before robot B is allowed to resume its job. If the collision can be avoided in this manner then the operator inserts stop commands into the program for robot A. These stop commands cause robot A to stop and to send out a "position" signal. This indicates that robot A has reached a desired point, such as completion of passage through the potential collision zone. The position signal may be based upon any desired criteria but is preferably based upon the completion of a command in the job. The operator also inserts stop commands into the program for robot B. Finally, the operator creates a control program for the central controller. The control program for the central controller is a series of instructions which causes the central controller to look for a position signal from all of the robots. Once the central controller has received a position signal from all of the robots the central controller sends a resume signal to all the robots. The resume signal allows the robots to resume execution of their respective programs until the next stop command is encountered. The use of the stop commands causes a robots to stop at a preselected point and wait until it receives permission to resume from the controller. The central controller will not give permission until all of the robots have reached stop points. Therefore, the robots will briefly stop and, when all the robots have stopped, the central controller will allow the robots to resume.

To avoid a collision, the operator will insert a stop command into the program for robot B. The stop command is inserted to cause the robot B to stop at the point (command in the job) just prior to where the robots may collide. The operator will also insert a stop command into the program for robot A. This stop command is preferably inserted at the point where robot A has cleared the area of danger (completed the steps necessary to be clear of robot B when robot B performs its sequence of steps). There is preferably the same number of stop commands in the program for robot A as in the program for robot B. Otherwise, robot A might run completely through its program and begin the next program. Then, the operator will insert a position tests into the central controller. When robot B reaches the beginning of the danger zone it will encounter its first stop command and will send a signal to the central controller that it has stopped. This assures that robot B is in known position prior to beginning the collision avoidance sequence. When the controller has received the signal from robot A that robot A has completed its operation then the controller will send a signal authorizing robot B to proceed. Note that, as a result, robot A is performing the desired movements while robot B is waiting. When robot A completes its movements and encounters its stop command it will stop and send a signal to the central controller that it has stopped. This means that robot A has completed its movements and so robot B can begin its movements. The central controller has now received the position signals from both robots so the controller sends a signal to both robots authorizing them to resume. The robots can then proceed to execute the remainder of their respective jobs, at least until the next stop command is encountered. Preferably, there is a stop command at the end of each job to notify the controller that the robots have completed their operations. Therefore, by the insertion of stop commands into the programs for the robots and tests into the program for the central controller, the movements of the robots have been sequenced so as to avoid collision between the robots.

In an alternative embodiment, to avoid a collision, the operator will insert a stop command into the program for robot A and insert two consecutive stop commands into the program for robot B. The stop commands are inserted to cause the robots to stop at the point (command in the job) just prior to where the robots may collide. The operator will then insert two stop commands into the program for robot A at the point where robot A has cleared the area of danger (completed the steps necessary to be clear of robot B when robot B performs its sequence of steps). Then, the operator will insert a stop command into the program from robot B at the point where robot B has cleared the area of danger. Finally, the operator will insert three position tests into the central controller. When robots A and B reach the beginning of the danger zone they will both encounter their first stop commands and will send a signal to the controller that they have stopped. This assures that both robots are in known positions prior to beginning the collision avoidance sequence. When the central controller has received the signal from both robots then the central controller will send a signal authorizing the robots to proceed. Robot A then proceeds to execute the next command(s) in its job. However, robot B immediately encounters its second stop command so it stops and sends a signal to the controller that it has stopped. Note that, as a result, robot A is performing the desired movements while robot B is waiting. When robot A completes its movements it will encounter its second stop command so it will stop and send a signal to the controller that it has stopped. This means that robot A has completed its movements and so robot B can begin its movements. The central controller has now received the position signals from both robots so the central controller sends a signal to both robots authorizing them to resume. Now, robot A will immediately encounter its third stop command so it stops and sends a signal to the central controller that it has stopped. Note that, as a result, robot B is performing the desired movements while it is now robot A that is waiting. When robot B completes its movements it will encounter its third stop command so it stops and sends a signal to the central controller that it has stopped. At this point both robot A and robot B have completed their respective movements, have cleared the danger zone, and are waiting for authorization to proceed. The central controller has now received the position signals from both robots so the central controller sends a signal to both robots authorizing them to resume. The robots can then proceed to execute the remainder of their respective jobs, at least until the next stop command is encountered. Preferably, there is a stop command at the end of each job to notify the controller that the robots have completed their operations. Therefore, by the insertion of three stop commands into the programs for the robots and three tests into the program for the central controller, the movements of the robots have been sequenced so as to avoid collision between the robots.

The touch-sensing operations and the welding operations are very movement intensive in that extensive rotating, bending, and twisting procedures may be used to achieve the desired results. Therefore, even if the robots do not appear to collide in the single-step process, there may be a collision if the robots are in the normal speed mode of operation and one robot is lagging behind the other robots because of a slow motor, or the number and/or complexity of the operations required to get into position. This lag can cause a collision that otherwise would not have occurred. Therefore, in the preferred embodiment, out of an abundance of caution, the robots are synchronized at critical points. The job for each robot includes a stop command once the robot has positioned the welding torch inside the compartment, a stop command at the end of each touch-sensing operation, a stop command before each welding operation, and a stop command at the end of each welding operation. Therefore, even if a robot is slow, the controller will not allow any robot to proceed to the next set of steps until all robots have reached the desired positions. As a result, all robots will wait until the slowest robot has completed its operation.

Once the jobs have been completely stepped through and the stopping points placed as necessary then the operator instructs the controller and the robots to execute their programs at a slow speed. This allows the operator to confirm that the robots will not collide while still providing the operator enough time to react and immediately stop the execution of the programs if the operator determines that a collision is about to occur. The operator can then further modify the programs to insert additional stops or to modify the job of a robot so as to prevent the collision from occurring.

After the operator has confirmed that there will be no collisions then the operator saves (stores) the modified jobs. In the preferred embodiment, the programs are saved in the robot memories. In an alternative embodiment, the programs are saved in the central controller. Regardless of where stored, the programs can be recalled and downloaded for use whenever desired.

In actual operation, each robot will execute its own job at full speed, stopping at the specified points, and waiting for permission to resume. The controller will monitor each robot and, when a robot notifies the controller that the robot has stopped, the controller will determine whether the robot(s) may be allowed to proceed. Further, a robot will stop and notify the controller whenever that robot reaches the specific point so that all the robots may resume execution of the jobs without danger of a collision.

The present invention therefore provides that collisions between robots are avoided while still maintaining the speed of operation of a welding process.

The present invention also provides for the use of a single welding program to perform welding operations for a plurality of different welds. In the preferred embodiment, the welding programs for the robots are stored in the individual robots. The single program is suitable for a plurality of different welding operations and can be modified for the particular welding operation to be performed. More particularly, the welding program may be modified by changing the compartment entry point, the weld starting point, and/or the weld ending point. Therefore, a robot needs only store a welding program which is representative of a class of welding operations. Further, the robot can automatically modify the program by using the touchsensing feature and the change position feature to reprogram the starting, ending, and intermediate points along a weld to be made.

The welding program for each robot contains several segments. A first segment performs the initial positioning of the torch in the compartment. A second segment determines the starting and ending coordinates for the welding seam in the compartment determined by the first segment. A third segment performs the welding operation using the coordinates determined in the second segment and then returns the robot to the home position. The second segment uses the touch-sensing feature of the robot to determine the location of the walls of the compartment of interest and, therefore, the exact coordinates of the corners which are to be welded. The robot therefore performs the actual welding operation using these coordinates. The present invention has thus automatically and precisely determined the exact starting and ending points of the welding operation. This provides for the performance of a desired weld even if the precise coordinates on the workpiece are unknown or cannot be directly measured by the operator.

Therefore, a robot can use a single program to perform welding operations on areas which are merely similar, even if not identical, because the robot automatically determines the coordinates of the area prior to beginning a welding operation and uses the coordinates in the welding operation. The one program will therefore suffice for a plurality of different welding areas, rather than having to use a separate program for each welding area.

The present invention also provides a method for programming a first robot and a second robot to avoid collisions between these robots. The method comprises the steps of: specifying a desired zone of operation for each of the robots; causing the robots to develop jobs, where each robot develops its own job to reach its desired zone of operation; stepping the robots through the jobs; inserting stop points in each of the jobs as necessary to prevent a collision between the robots; specifying resume conditions for any stop points; and storing the jobs with the stop points. The step of specifying resume conditions preferably comprises determining that all the robots have stopped, but may also specify the occurrence of a specified movement by another robot or the passage of a specified amount of time.

The present invention thus provides a method which prevents collisions between robots which are operating in the same area, especially those robots operating on the same workpiece. This method works with existing robot welders, does not require modifications to the robots, and does not require expensive computer spatial analysis programs, which may not even be available for the type of processor used in a particular robot.

Therefore, the present invention provides a method for programming a first robot and a second robot to avoid collisions between the robots by specifying a desired zone of operation for the first robot and a desired zone of operation for the second robot, developing a job for each of the robots, where the jobs instruct the robots how to reach the desired zones, simultaneously stepping both robots through their own jobs, observing the robots as the robots are stepped through their jobs, inserting stop points as necessary to prevent a collision between the robots, specifying resume conditions for the stop points, and storing the jobs with the stop points. The step of specifying resume conditions includes specifying at least one of the following: all robots being at stop points, passage of a specified amount of time, and completion of a specified movement by another robot. The step of specifying the zone of operation for a robot includes specifying an area where the robot is to perform a specified process, such as a welding operation.

The present invention also provides a method of operating a first robot and a second robot by receiving a signal that the first robot has reached a first predetermined point, receiving a signal that the second robot has reached a second predetermined point, authorizing the first robot to proceed to a third predetermined point, waiting for a signal that the first robot has reached the third predetermined point, receiving the signal that the first robot has reached the third predetermined point, and authorizing the second robot to proceed to a fourth predetermined point. This method further includes waiting for a signal that the second robot has reached the fourth predetermined point, receiving the signal that the second robot has reached the fourth predetermined point, and authorizing the first robot and the second robot to proceed to next points.

The present invention further provides a method of operating a robot by proceeding to a first predetermined point, sending a signal that the robot has reached the first predetermined point, stopping the robot from proceeding further, waiting for authorization to proceed to a second predetermined point, receiving the authorization to proceed to the second predetermined point, and proceeding to the second predetermined point. The method further includes sending a signal that the robot has reached the second predetermined point.

The present invention also provides a method for specifying a compartment entry point for a welding operation based upon data provided from a CAD program. The size and position of the components of the workpiece are obtained from the CAD program, the largest component is determined, the center and edge of the largest component is determined, and the entry point is the above center and edge, offset to account for the dimensions of the robot arm.

The present invention therefore provides a method of automatically determining an entry point into a compartment composed of several members by determining a largest member, determining a center point of this largest member with respect to the compartment, determining a flange width for this largest member, and offsetting the center point by the flange width to generate the entry point. If the entry point is for a robot arm having a predetermined physical size then the method includes further offsetting the center point by the size of the robot arm. The step of offsetting includes moving from the center point by the flange width toward the center of the compartment to generate the entry point. If the entry point is for a robot arm having a predetermined physical size, then the step of offsetting comprises moving from the center point by the flange width and the size of the robot arm toward the center of the compartment to generate the entry point.

The present invention also provides a method for automatically determining the starting and ending coordinates of a weld. The touch-sensing capabilities of the robot are used to determine the locations of the corners of the weld, the coordinates of the corners are then used to modify the welding job by specifying the corners as the starting and ending points of the weld. The starting coordinates of a weld are determined by moving a probe, such as the tip or the wire in the welding torch, in a first direction to determine a coordinate for a first boundary, moving the probe in a second direction to determine a coordinate for a second boundary, the second direction being at a right angle to the first direction, moving the probe in a third direction to determine a coordinate for a third boundary, the third direction being at right angles to both the first direction and the second direction, and defining the starting coordinates as the coordinate for the first boundary, the coordinate for the second boundary, and the coordinate for the third boundary. The ending coordinates of a weld are determined by moving a probe in a first direction to determine a coordinate for a first boundary, moving the probe in a second direction to determine a coordinate for a second boundary, the second direction being at a right angle to the first direction, moving the probe in a third direction to determine a coordinate for a third boundary, the third direction being at right angles to both the first direction and the second direction, and defining the ending coordinates as the coordinate for the first boundary, the coordinate for the second boundary, and the coordinate for the third boundary.

The present invention also provides a method for automatically determining the position of a torch to provide for an optimum angle of attack for a welding operation. The depth, width, and flange overhang for a compartment are preferably obtained from a computer aided design (CAD) program used for designing the workpiece. This information is then used to automatically determine the range of possible angles of attack for the torch. Robot arm positioning is then selected so as the most closely achieve the desired angle of attack within the possible range of values.

The present invention provides for determining a range of approach angles for a welding torch in a confined area by determining a height for the confined area, determining an overhang for the confined area, determining a width for the confined area, defining a first approach angle based upon the height and the overhang, defining a second approach angle based upon the height and the width, and defining the range as being bounded by the first approach angle and the second approach angle. The present invention also provides for controlling an approach angle for a welding torch of a robot in a confined area by determining a height for the confined area, determining an overhang for the confined area, determining a width for the confined area, defining a first approach angle based upon the height and the overhang, defining a second approach angle based upon the height and the width, defining a range of approach angles as being bounded by the first approach angle and the second approach angle, obtaining a desired approach angle for the welding torch, if the desired approach angle is within the range then instructing the robot to use the desired approach angle, if the desired approach angle is greater than the range then instructing the robot to use the first approach angle, and if the desired approach angle is less than the range then instructing the robot to use the second approach angle. If the height, overhang, and width of the confined area are defined in a computer-based specification, such as a computer aided design (CAD) program, then the present invention includes the additional steps of selecting the confined area and automatically obtaining the height, overhang, and width from the computer-based specification in response to the selecting of the confined area.

The present invention also provides a method for automatically tracking the joint for a welding seam between two components which are not in the same plane, such as two plates which are perpendicular to each other. The welding torch is caused to deviate, such as weaving or dithering, as it moves along the projected welding path. The current is measured at the peak deviations and the current measurements are accumulated for a predetermined number of measurements. The cumulative current for the deviation in one direction is compared with the cumulative current for the deviation in the other direction and the torch is caused to move in the direction of the deviation which produced the smaller cumulative current.

The present invention therefore provides for automatically tracking the joint between a first component and a second component for performing a welding operation by defining a preliminary path for the joint, moving a welding torch along the preliminary path, providing an arc welding current to the welding torch, alternately moving the welding torch slightly to a first side of the preliminary path and to a second side of the preliminary path as the welding torch is being moved along the preliminary path, providing a first current measurement by measuring the arc welding current when the welding torch is to the first side, providing a second current measurement by measuring the arc welding current when the welding torch is to the second side, comparing the first current measurement and the second current measurement, and redefining the preliminary welding path by moving the welding torch slightly to the side having the smaller of the current measurements. The first current measurement may be provided by measuring the arc welding current at each of a predetermined number of points, and summing the measurements for these points to provide a cumulative current measurement as the first current measurement. The first current measurement may also be provided by measuring the arc welding current for each of a predetermined number of points, and averaging the measurements for these points to provide an average current measurement as the first current measurement.

The present invention also provides a method for automatically tracking an edge or an outside corner of a component for applying a welding bead to the edge or corner. The welding torch is caused to deviate, such as weaving or dithering, as it moves along the edge. The current is measured at the peak deviations and the current measurements are accumulated for a predetermined number of measurements. The cumulative current for the deviation away from the edge is compared with the cumulative current for the deviation toward the edge and the torch is caused to move in the direction of the deviation which produced the larger cumulative current.

The present invention provides for automatically tracking an edge of a component for performing a welding operation, such as laying a welding bead along the edge, by defining a preliminary path along the edge, moving the welding torch along the preliminary path, providing an arc welding current to the welding torch, alternately moving the welding torch slightly to a first side of the preliminary path and to a second side of the preliminary path as the welding torch is being moved along the preliminary path, providing a first current measurement by measuring the arc welding current when the welding torch is to the first side, providing a second current measurement by measuring the arc welding current when the welding torch is to the second side, comparing the first current measurement and the second current measurement, and redefining the preliminary welding path by moving the welding torch slightly to the side having the smaller of the current measurements. The first current measurement may be provided by measuring the arc welding current for each of a predetermined number of points, and summing the measurements for these points to provide a cumulative current measurement as the first current measurement. The first current measurement may also be provided by measuring the arc welding current for each of a predetermined number of points, and averaging the measurements for these points to provide an average current measurement as the first current measurement.

The present invention also provides a method for tracking a welding seam and automatically detecting and compensating for certain conditions, such as a wider than normal seam. The present invention uses a plurality of infrared emitters and detectors around the torch to detect changes in the reflectivity of the components around the path. The central controller, or the microprocessor in the robot, evaluates the signals to determine the condition ahead and then executes the response to that condition. For example, the presence of a small crack, or a slightly wider seam, will cause the robot to move the torch back and forth across the seam so as the encompass the crack or fill in the wider seam.

The present invention also provides for selecting a welding program based upon the characteristics of the particular compartment to be welded. A plurality of welding programs is generated for each of a plurality of different compartment types. The welding program for the particular compartment is selected by inspecting the compartment types and orientations for the plurality of welding programs and selecting a welding program which has a compartment type and orientation closest to those characteristics of the particular compartment.

The present invention further provides for generating a welding program from empirical formulas. A plurality of welding programs is generated for each of a plurality of different compartment types. The welding programs are inspected to empirically determine formulas for moving, placing, and welding based upon such characteristics as the compartment type, size, and orientation. Then, the compartment type, size and orientation for a particular welding operation are specified and the empirical formulas are used to generate a welding program specific to that condition.

The present invention also provides for storing a plurality of welding programs in a central controller and downloading a program for a specific welding operation to the robot which is to perform the welding operation.

Other objects, features, and advantages of the present invention will become apparent upon reading the following description of the preferred embodiment, when taken in conjunction with the drawings and the claims.

BRIEF DESCRIPTION OF THE DRAWINGS

FIG. 5 illustrates the touch sensing operation of the present invention.

FIGS. 6A and 6B illustrate the torch in two differently shaped compartments.

FIGS. 7A, 7B and 7C illustrate the seam tracking process for various types of welds.

FIG. 8A illustrates a compartment or box on a horizontal plane.

FIG. 8B illustrates the same compartment on a different plane.

FIG. 9 illustrates a workpiece monitoring device.

FIG. 10 illustrates the universal programming mechanism.

FIG. 11 illustrates the use of bar codes for programming the robots.

FIG. 12 illustrates one method of off-line programming of the robots.

DETAILED DESCRIPTION OF THE INVENTION

Figure 1:
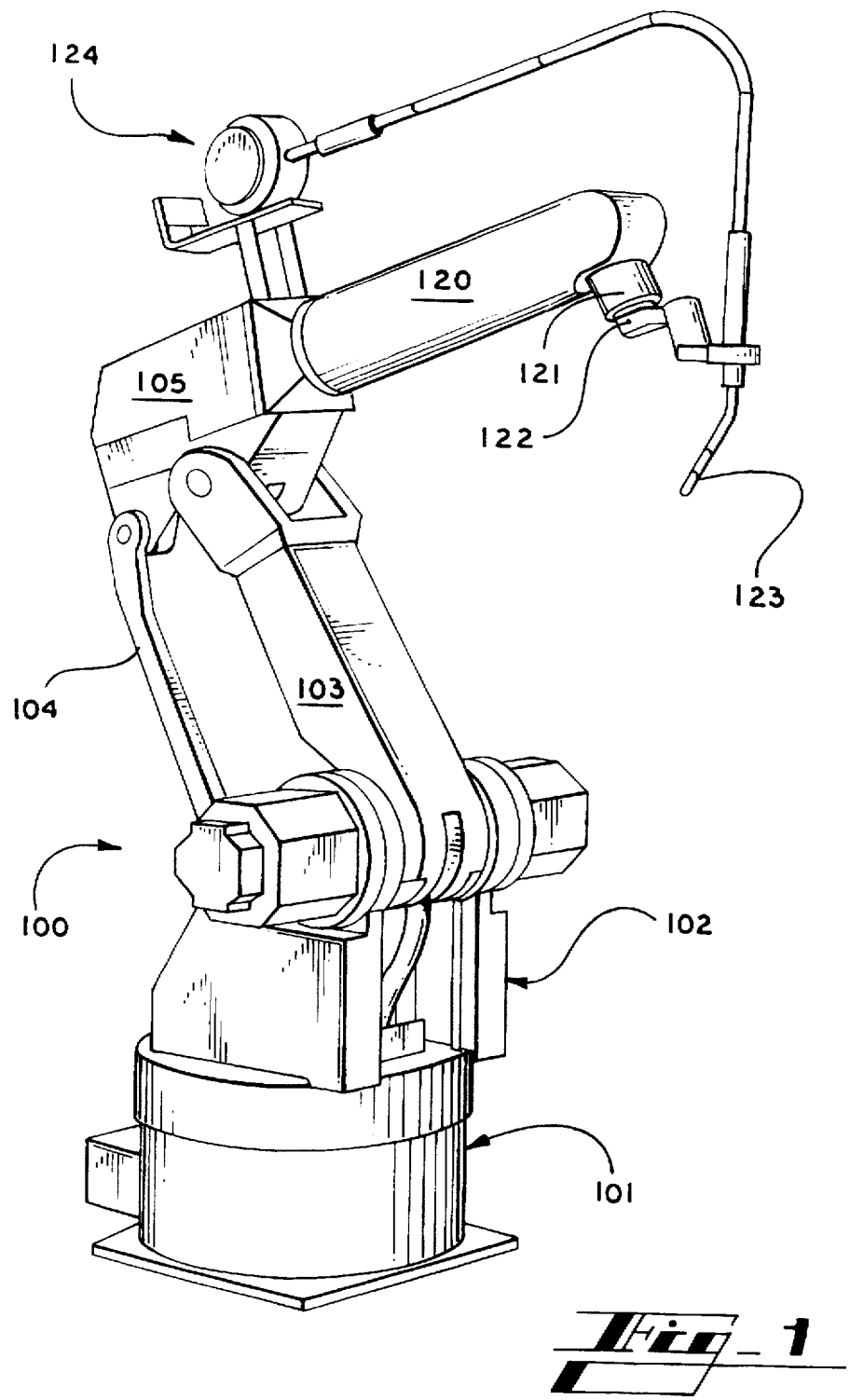
FIG. 1 is an illustration of a typical robot welder as used in the preferred embodiment of the present invention.

FIG. 1 is an illustration of a typical robot welder as used in the preferred embodiment of the present invention. Robot welder 100 may be, for example, a Panasonic Industrial Robot Pana Robo Model AW-010A, manufactured by Matsushita Industrial Equipment Co., Ltd., Osaka, Japan. This particular model is specifically adapted for use in automatic welding operations. Robot 100 has a base 101 and a turret 102. The turret 102 is rotatably connected to the base 101 (turret rotation degree of freedom). A front arm 103 is rotatably connected to the turret 102 (front arm degree of freedom). A rear arm 104 is also connected to the turret 102. The front arm 103 and the rear arm 104 are connected to the upper arm 105. The front arm 103 and the rear arm 104 are independent so the rear arm 104 can be used to adjust the angle of the upper arm 105 after the front arm 103 has positioned the upper arm 105 (upper arm degree of freedom).

The upper arm 105 is rotatably connected to a wrist assembly 120 (wrist rotation degree of freedom). The wrist assembly 120 can be extended or retracted (forward-backward linear degree of freedom). Further, the wrist assembly 120 is rotatably connected to a first member 121 (wrist bending degree of freedom). The first member 121 is rotatably connected to a second member 122 (wrist twisting degree of freedom). Also, the second member can be extended from or withdrawn to the first member (up-down linear degree of freedom). The second member 122 holds an electronic arc welding torch 123, which is fed by a wire feeder 124. Each robot welder 100 includes a microprocessor and a memory for storing a job (not shown).

The memory in each robot 100 can store approximately 15000 steps or commands. In the preferred embodiment, a job, also sometimes referred to herein as a movement program, consists of a series of smaller programs, or subprograms. A robot can store about 1000 jobs. Each program consists of a series of steps and may be called from any job. A program is a group of move, weld, and sequence commands, as shown below, and may be, for example, an actual welding operation on a specified area, may be a robot arm or torch positioning operation, or may be a wire cutting and nozzle cleaning procedure. In the example shown below, the JOB 76 consists of three welding programs (34, 25, 30) plus three other programs (5, 440, 4) and two libraries (2, 3). A library is a group of sequencing commands, as shown below. Note that a program or library can be called more than once by the same job.

| JOB 76 | |
|---|---|
| Gosub Library 3 | Notifies controller 230 that a job has been started. |
| Gosub Program 5 | Robot moves from home position to a point above the work area. |
| Gosub Program 34 | Performs actual welding operation and end with torch positioned over the work area. |
| Gosub Program 440 | Cut welding wire and clean nozzle. Position torch over the work area. |
| Gosub Program 25 | Performs actual welding operation and ends with torch positioned over the work area. |
| Gosub Program 440 | Cut welding wire and clean nozzle. Position torch over the work area. |
| Gosub Program 30 | Performs actual welding operation and ends with torch positioned over the work area. |
| Gosub Program 4 | Robot returns to home position. |
| Gosub Library 2 | Notifies controller 230 that the job has been finished. |

| LIBRARY 3 | |
|---|---|
| OUTB OPORT1 = 1 0 | Causes robot to place a logic 1 at output no. 1. This alerts the controller 230 that the robot has reached the specified position. |
| WAIT IPORT3 = 1 | Causes robot to wait to input no. 3 to be a logic 1. This signal comes from controller 230 and is the resume command. |

| PROGRAM 5 | |
|---|---|
| Move1 7.5 | Moves robot arm to a specified location at 7.5 meters per second. |
| Move1 7.5 | Moves robot arm to a specified location at 7.5 meters per second. |
| Gosub Library 1 | Calls Library 1 subroutine which sends an output signal to the controller 230, signifying that the robot has now reached a specified position. Typically, the robot will now wait until it receives a resume command from the controller 230, and the controller 230 waits until it has received similar output signals from the other robots. |
| Move1 7.5 | Moves robot arm to a specified location at 7.5 meters per second. |

Figure 2:
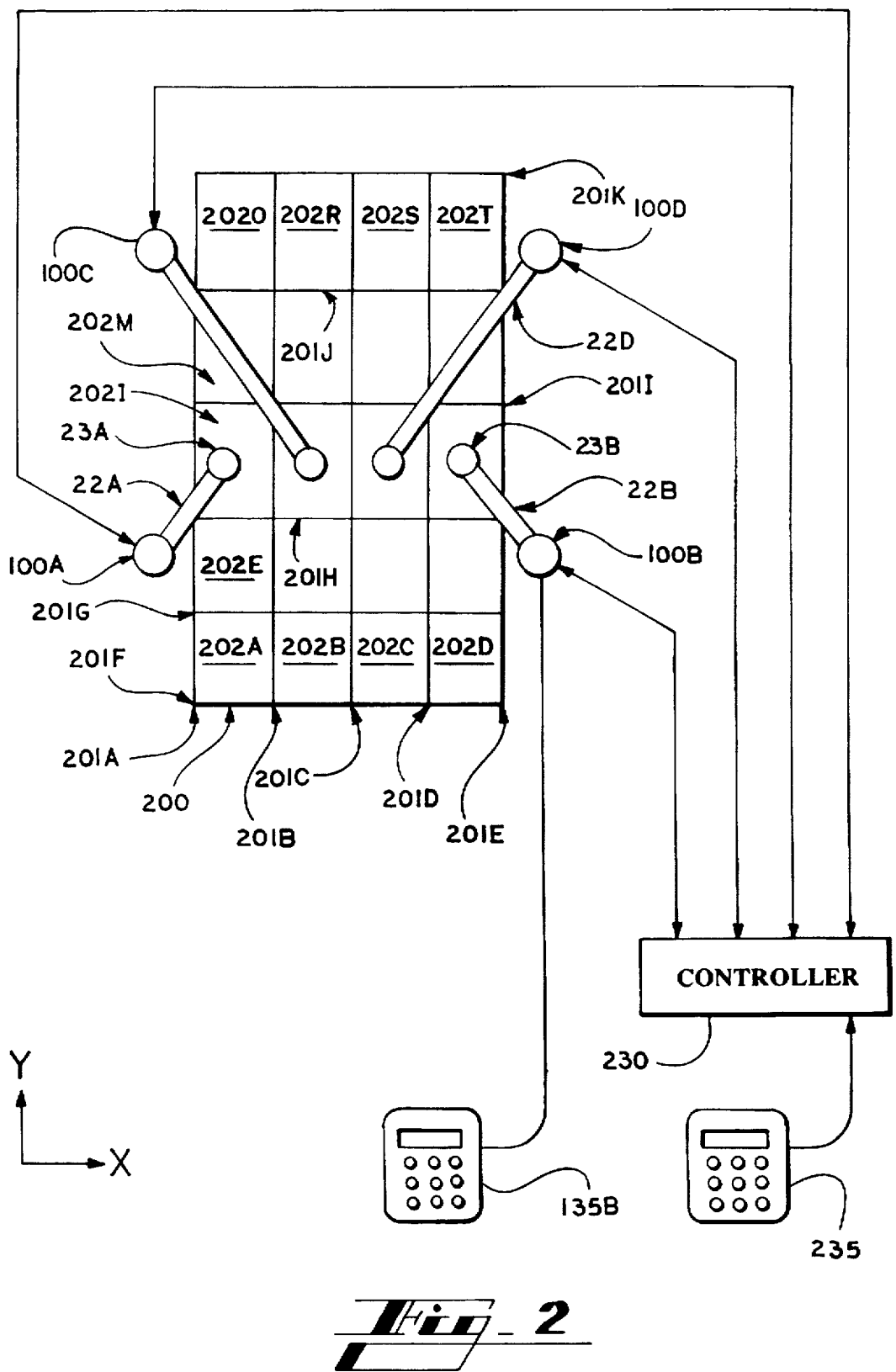
FIG. 2 is an illustration of a typical operating environment for the preferred embodiment of the present invention.

FIG.2 is an illustration of the typical operating environment for the preferred embodiment of the present invention. The illustration shows four robots 100A-100D operating on a workpiece 200. The workpiece may be a complete assembly or may be part of an assembly which is to be joined together into a complete assembly at a later time. One example of a workpiece 200 is part of a military pontoon boat. The workpiece 200 comprises a plurality of members 201A-201K, such as T's, bars, and cross-bars, which are used as, for example, stringers and headers. The members 201 form compartments 202A-202P within workpiece 200. Robots 100A-100D are shown in position to perform an operation, such as a welding operation, on the workpiece 200. It will be appreciated that if, for example, robot 100D attempts to rotate counterclockwise while robot 100B is in the position shown then there will be a collision. This collision can possibly be avoided if robot 100B retracts and/or lowers second member 22B and/or turns counterclockwise to some degree. However, the robots 100 operate independent of each other. Moreover, a robot 100 does not know and does not have the capability of knowing where any other robot 100 is, so a robot 100 cannot initiate action to avoid a collision.

A control/teaching pendant 135 having a plurality of control buttons or keys and a display screen (not shown separately) allows the operator to directly control the operation of a robot 100. The pendant 135 also allows the operator to insert commands, delete commands, and otherwise modify a program. There are four pendants, one associated with each of the robots 100A-100D but, for convenience of illustration, only pendant 135B is shown. Pendants 135 are standard equipment with the specified robots 100.

The preferred embodiment uses a central controller 230 to control the position of the workpiece, and to coordinate the movement of the robots 100 to avoid collisions. A control/teaching pendant 235, having a plurality of control buttons or keys and a display screen (not shown separately), allows the operator to insert commands, delete commands, and otherwise modify the program in the controller 230. A standard computer terminal keyboard (not shown) or other input device may also be used for this purpose. Pendant 235 or the installed input device may also be used to input commands directly into the robot, in which case controller 230 acts merely as a conduit for the commands.

In the preferred embodiment the workpiece 200 is on a cart (not shown) which may be moved forward (toward robots 100C and 100D) and backward (toward robots 100A and 100B) so that the different compartments in the workpiece 200 are accessible to the robots 100. The cart is servo-controlled and is operated under the control of controller 230. In the preferred embodiment there are at least two carts so that welding operations may be conducted on a workpiece which is on one cart while another workpiece is being loaded onto or unloaded from the other cart. This provides for continuous welding which increases the efficiency of the overall operation.

Controller 230 is programmed by the operator to control the sequence of welding operations, that is, which compartment or group of compartments is first, which compartment or group of compartments is second, and so on. In the preferred embodiment the welding is performed in a non-linear manner. That is, group 202A (compartments 202A, 202B, 202C, and 202D) may be welded first, then group 202M, then group 202E, then group 202Q, and finally group 202I. This prevents heat buildup in any area because heat buildup can lead to distortion of the workpiece 200. In the preferred embodiment the robots are stationary but is contemplated that, in some circumstances, such as where the workpiece is very large, it may be desirable or necessary to move the robots 100 with respect to the workpiece 200.

One function of the controller 230 therefore is to position the cart in the proper zone. A proper zone or position in a zone is one which provides for maximum agility of the robots. That is, a robot does not have to approach a limit condition on any axis in order to access the desired compartment. A cart does not move while the robots 100 are welding. Therefore, the controller program may instruct the cart to move to zone 202A, which may correspond to positioning the workpiece so that compartments 202A-202D are in position for the welding operation. The controller then sends a command to all the robots to execute a specified job, for example, JOB 76. Each robot 100 will then begin to execute its own JOB 76, which will generally be slightly different than the JOB 76 for another robot because the home position of each robot is different and because each robot will be welding in a different area than any other robot. However, the Jobs 76 will have been previously synchronized, as described below, so that the robots 100 can execute their respective jobs 76 in unison without colliding. Thus, the controller 230 program would comprise the statements: Zone 202A, Job 76; Zone 202M, Job 76; Zone 202E, Job 76; Zone 202Q, Job 76; and Zone 202I, Job 76. A job, such as JOB 76, preferably includes programs necessary to perform all of the welding operations on a specified compartment, such as compartment 202A.

The controller 230 also monitors for various signals from the individual robots. These signals include, among others, emergency stop signals, signals triggered by the software in the robots 100, and "wait" signals. A "wait" signal is provided by a robot when it reaches a stop command in the program that it is executing. When the controller 230 detects "wait" signals from all of the robots 100 then it sends a "resume" signal to all of the robots 100. The program in a robot 100 provides that, once the robot has sent out a "wait" signal, the robot will not proceed until a "resume" signal has been received.

Collision Avoidance

To avoid collisions between the robots the present invention provides that the operator synchronizes the job programs for the robots. The process of synchronization requires the operator to insert a series of stop commands (stops) into the job for each robot, determine which stops are necessary to prevent collisions, add the conditions under which the program may be resumed, and remove unnecessary stops. Therefore, in the above example, robots 100A–100D would be executing their respective jobs and robots 100B and 100D would be heading for a collision. However, just prior to the collision point, robot 100D would encounter a stop in its job. The other robots 100 would continue in their operations because they had not encountered a stop command. Once these robots have completed the operations which remove them from the danger zone then they encounter a stop command. Controller 230 is notified that all of the robots 100 have stopped so controller 230 sends out a resume command. Then, robots 100A–100C would encounter a second stop command in their jobs and notify controller 230 that they had stopped. However, robot 100D would encounter normal commands so it would continue in its movement. Now, robots 100A–100C are waiting while robot 100D continues. Robot 100D continues movement until it reaches the next stop point. Robot 100D would then stop and notify controller 230 that it had stopped. Controller 230 would then again know that all the robots 100A–100D had reached their next desired positions and had stopped. Controller 230 would then instruct the robots 100A–100D to resume movement.

In an alternative embodiment, the operator more closely synchronizes the job programs for the robots. The process of synchronization requires the operator to insert a series of stop commands (stops) into the job for each robot, determine which stops are necessary to prevent collisions, add the conditions under which the program may be resumed, and remove unnecessary stops. Therefore, in the above example, robots 100A–100D would be executing their respective jobs and robots 100B and 100D would be heading for a collision. However, just prior to the collision point, each of the robots 100 would encounter a stop in its job. Each of the robots 100 would therefore stop, and notify controller 230 that it had stopped. Once controller 230 is notified that all of the robots 100 have stopped, then controller 230 sends out a resume command. The robots 100 then continue the execution of their respective jobs. Robots 100A–100C would encounter normal commands, so they would continue in their movements. However, robot 100D would immediately encounter another stop command. Therefore, robot 100D would wait while robots 100A–100C continued. Then, robots 100A–100C would encounter a stop command in their jobs and notify controller 230 that they had stopped. When robots 100A–100C had so notified controller 230 then, because all of the robots 100 had again notified controller 230 that they had stopped, controller 230 would issue another resume command. At this point, robots 100A–100C would immediately encounter another stop command. However, robot 100D would encounter normal commands so it would continue in its movement. Now, robots 100A–100C are waiting while robot 100D continues. Robot 100D continues movement until it reaches the next stop point. Robot 100D would then stop and notify controller 230 that it had stopped. Controller 230 would then again know that all the robots 100A–100D had reached their next desired positions and had stopped. Controller 230 would then instruct the robots 100A–100D to resume movement. This embodiment differs from the first described embodiment in that it has an additional stop command. This slows the operation of the robots slightly but provides for more precise control of the robots because a stop is encountered at the beginning and end of each collision zone, thereby assuring that all robots are in the proper position before any of the robots enter into the collision zone.

Jobs which are run together must have the same number of stop commands. If not, then a robot will not be able to finish the job because it will be stuck at a stop command waiting for a resume command which will never come. This arises because, in the preferred embodiment, the controller 230 does not send out a resume signal until it has received wait signals from all of the robots. A collision avoidance routine may be followed immediately by another collision avoidance routine if necessary. In some complex jobs, several collision avoidance routines may be necessary to properly coordinate positioning the torches, conducting the welding operations, and retracting the torches.

Figure 3A:
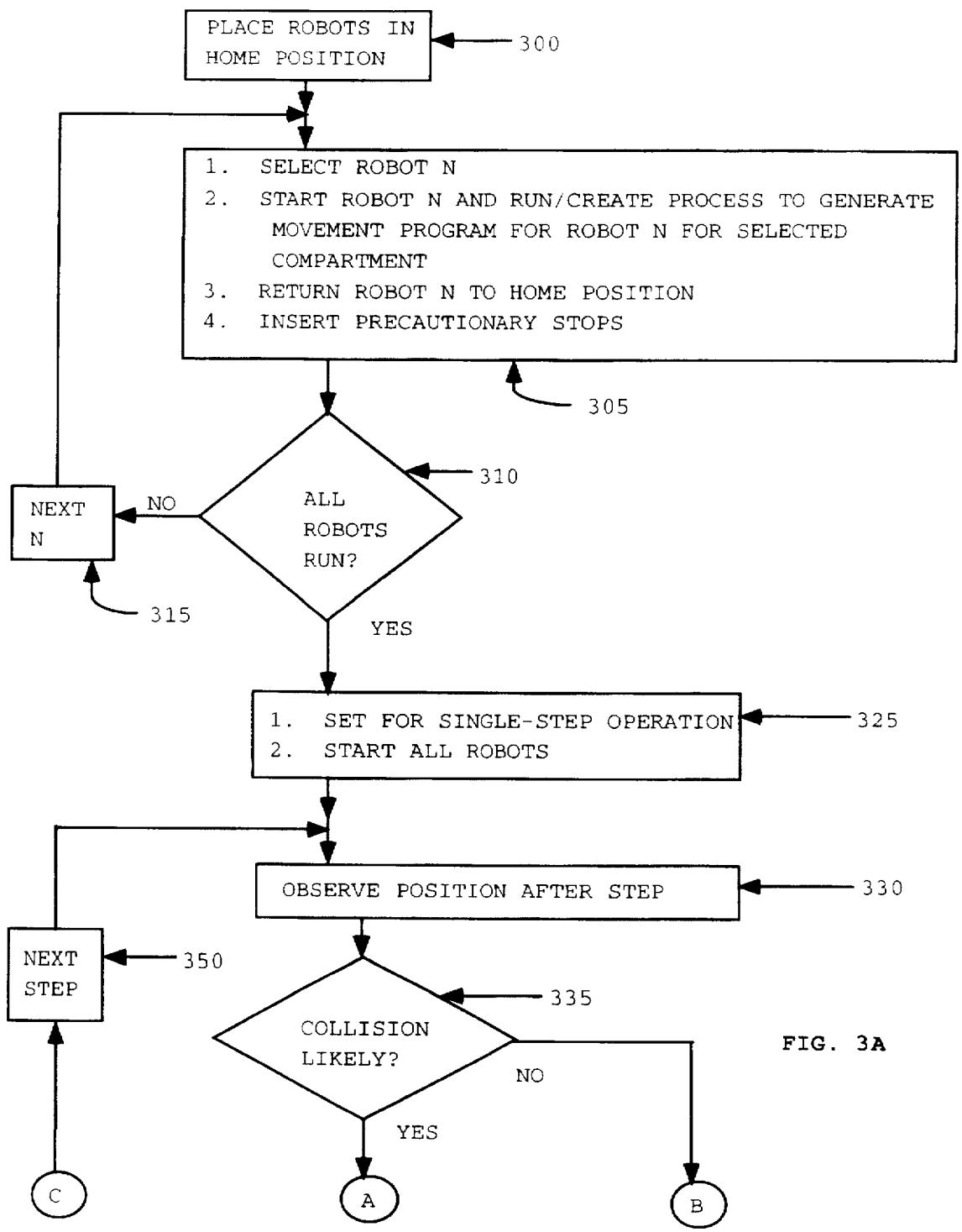
FIGS. 3A–3B are a flow chart illustrating the process of the present invention.
Figure 3B:
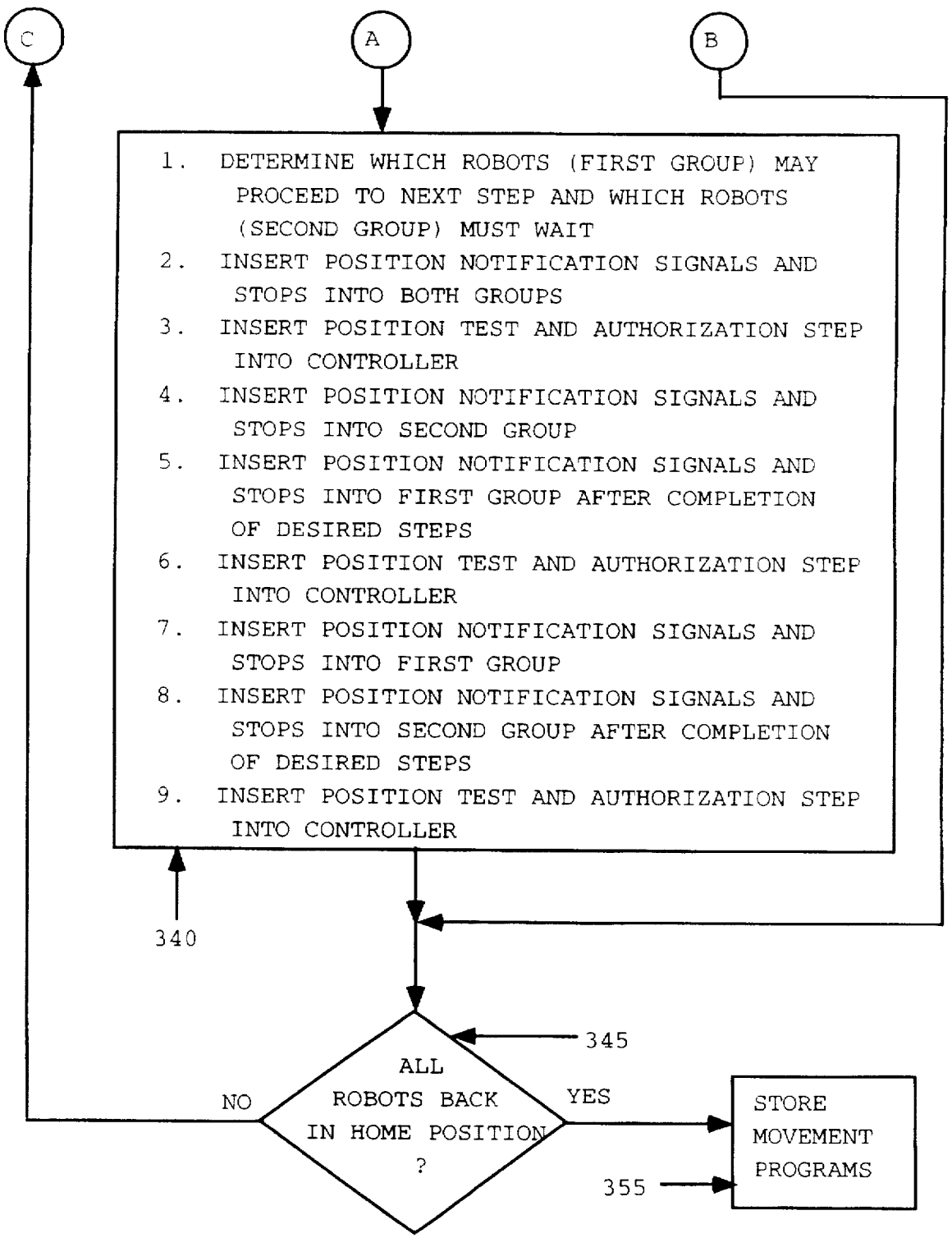

FIGS. 3A–3B are a flow chart illustrating the process of the present invention. At step 300, the operator visually divides the workpiece into four sections (one section for each robot), the sections preferably being approximately equal. The operator then preferably causes all robots to be placed in home (base) positions, so as to assure a known starting point and to assure that each robot has complete freedom of movement, and places the workpiece in position for the desired welding operation by causing controller 230 to move the cart into the desired position. These startup positions may also be part of the program of controller 230. The process then begins with the first robot. The first robot may be any of the robots 100, such as robot 100C for example.

At step 305 a robot N is selected, enabled and operated so as to create or enable a job N. The job N for robot N may have been previously generated by a computer, or previously generated by a human operator, or be a hybrid of both, or may be generated now in response to commands from the human operator using the control pendant 135 for that robot. The job N, such as job 76, is a computer program which instructs the robot what movement functions to perform and the sequence in which the movement functions should be performed.

If the job has not been created then the operator uses the pendant 135 to return the robot to a base or starting position and then to move the robot along the desired path, storing position points at intervals along the path, to go to and weld a designated line of welding. This process is performed until all of the movements and welding operations for the selected section have been completed and the robot returned to the home position. This process is then performed for the next section until jobs have been created for each section. It should be appreciated that the robot will follow the path designated by the points selected and stored by the operator whenever that job is selected. More points provides for more precise control over the movements (linear and angular positions) of the robot, but takes longer and requires more program steps. Fewer points provides for quicker movement and fewer program steps but provides for less control over the movements of the robot. For example, the operator may have to specify a series of points, with particular degrees of freedom and linear movements so as to position the torch 123 inside a compartment 202 while avoiding an overhanging flange of a member 201, because simply specifying one starting point and one ending point may cause the robot to take a more direct approach and jam the torch 123 into the flange of the member 201.

Jobs may be stored and recalled, so it is possible that a job which performs the desired operation may already have been created. The operator may, in this case, simply recall the previously stored program. In the preferred embodiment, the operator creates, or has previously created, several programs for each type of welding operation. Each program uses different approach angles or paths to accomplish the job. If there is more than one program which can accomplish the desired operation the operator selects programs which are the least likely to cause interference between the robots. This selection process involves running a program on each robot, visually tracing the movements of each robot, and making a judgment call as to whether that program should be used. Several repetitions of this process may be necessary to pick the best program for each robot for the particular welding operation.

Decision 310 tests whether the process of step 305 has been performed for all of the robots 100. It should be noted that the robots 100 may be selected in any desired order or sequence.

If, at decision 310, the process of generating or selecting all the necessary jobs has been completed then each robot will now have its basic job. That is, at this point, each robot has a program which is complete in that it contains all the instructions necessary for the robot to perform its specified welding operation. Although the programs selected preferably minimize the likelihood of collision, collision avoidance has not yet been fully addressed at this point. Therefore, the operator now begins the collision avoidance phase of programming the robots. In step 325, the robots are set for single step operation. In single step operation, a robot will only execute one command and will then stop and wait for authorization to execute the next command.

In step 330 the operator observes the robots after each step (completion of the execution of a command in the job) as the robots execute their respective jobs in the single step mode of operation. After each step, at decision 335, the operator decides whether any robots are heading for a collision. This is a judgment call based upon experience. In the preferred embodiment, a collision is deemed possible if any robots will pass within three or four inches of each other. This is a conservative figure and smaller distances are acceptable. If a collision will not occur then the programs are satisfactory at that point and the operator then proceeds to decision 345. However, if at decision 335 the operator determines that a collision may occur then in step 340 the operator determines how the collision can best be avoided: reprogramming, or waiting.

In the reprogramming option, the operator uses the pendant 135 for a robot to change the path that the robot will take to arrive at the desired position. For example, a collision may be avoided by simply causing one robot to take an indirect path, rather than a direct path, to get to its destination, thereby moving to one side or the other to provide adequate clearance for the other robot to pass by without either robot having to stop.

In the waiting option, the operator, again using the pendants 135, controls the sequence in which the robots execute the commands. For example, if the operator determines that robots 100A and 100B will collide then the operator may determine that, for example, the collision could be avoided by letting robot 100A complete the next command, or even a series of commands, before robot 100B is allowed to resume its job. Accordingly, in step 340 the operator determines which robots (first group or group 1) may proceed to the next step and which robots (second group or group 2) must wait. The operator then inserts, into the programs for the second group, a command to send a position notification signal (OUTB OPORT) to the controller 230, and a stop command (WAIT IPORT). This halts the operation of the second group so that the first group can complete the next step or steps, as appropriate, and also notifies the controller 230 that the second group has reached its desired position and is waiting for authorization to resume. The operator then steps the first group of robots through their programs until they have cleared the collision zone. The operator then inserts into the programs, for the first group, a command to send a position notification signal to the controller 230, and a stop command. The first group has now completed the authorized step(s), has notified the central controller 230 of same, and has stopped to wait for authorization to resume. Therefore, at this point, the first group has accomplished its steps while the second group was waiting. The operator then inserts into the program for controller 230 a position test. Note that the controller 230 has received wait signals from all of the robots. Therefore, all of the robots are in the proper location.

The operator then determines whether all of the robots may proceed or whether only the second group should proceed. If all of the robots may proceed then the operator inserts into the program for controller 230 a command to send a resume signal. This causes all of the robots to resume operation.

If only the second group should proceed then the operator inserts, into the programs for the first group, another command to send a position notification signal to the controller 230, and another stop command. The resume signal allows the robots to resume operation after the first stop command. However, this additional stop command again halts the operation of the first group so that the second group can complete the next step or steps, as appropriate, and also notifies the controller 230 that the first group is waiting for authorization to resume. The operator then steps the second group of robots through their programs until they have reached a point where they are clear of the zone where a collision was anticipated. The operator then inserts into the programs, for the second group, a command to send a position notification signal to the controller 230, and a stop command. The second group has now completed the authorized step(s), has notified the central controller 230 of same, and has stopped to wait for authorization to resume. Therefore, at this point, the second group has accomplished its steps while the first group was waiting. The operator then inserts into the program for controller 230 a position test. Now, if all of the robots are in the proper locations then the controller 230 will have received wait signals from all of the robots. The controller 230 can therefore send a resume command to the robots and all of the robots can resume execution of their programs.

In an alternative embodiment, the operator inserts two stop commands (rather than just one stop command) into the program for the second group of robots and inserts one stop command (rather than none) into the program for the first group of robots just prior to the steps where the robots are entering into the collision zone. The operator also inserts an additional position test into the controller so that the controller can send out an additional resume signal. This synchronizes the operation of the robots more closely. None of the robots is allowed to enter into the collision zone until the controller 230 determines that all of the robots have taken up their proper positions at the beginning of the collision zone. This assures that the robots are in known positions and, even if a robot is slow or stalled out, a collision is unlikely to occur.

To perform the job as quickly as possible, it is preferred that the robots operate simultaneously, rather than sequentially, as much as possible. The operator therefore determines whether all of the robots may proceed or whether only a selected group should proceed. If only a selected group should proceed then the operator performs the above process again. If all of the robots may proceed then the operator continues single stepping the robots through their respective jobs.

At decision 345 the operator determines whether each robot has completed its job. In the preferred embodiment each job returns the robot to its home position at the end of the job. Therefore, job completion can be determined by observing whether the robot has returned to its home position. If the robots are not in the home position then the jobs have not been completed so, at step 350, the operator authorizes the robots to execute the next step in their job programs. The operator is then at step 330 again.

If, at decision 345, the operator determines that all of the jobs have been completed then, at step 355, the operator causes the robots 100 to store their respective completed jobs. These jobs may be recalled, modified, and/or used as necessary for a particular welding process.

As previously stated, the touch-sensing operations and the welding operations are very movement intensive in that extensive rotating, bending, and twisting procedures may be used by the robot to achieve the desired position and/or results. Therefore, even if there does not appear to be a collision problem when single-stepping the robots, there may be a collision in actual use if one robot lags behind the other robots because of a slow motor or the number and/or complexity of the steps required to get into position or perform the desired operation. This lag can cause a collision that otherwise would not have occurred. Therefore, in the preferred embodiment, out of an abundance of caution, the robots are synchronized at critical points by inserting a series of precautionary stops.

To save execution time when the jobs are being executed it is preferable, as a general rule, to avoid using stop commands if a collision can be avoided by reprogramming the movement of a robot. However, there are some places where stop commands are preferably inserted, even if there does not appear to be a collision problem.

In the preferred embodiment, the operator modifies the job for each robot by inserting a stop command when the welding torch is directly above the compartment, another at the point where the robot has positioned the welding torch inside the compartment in position to start the touch-sensing operation, a stop command prior to the beginning of each touch-sensing operation, a stop command prior to the start of each welding operation, a stop command at the end of each welding operation, a stop command once the robot has retracted and positioned the welding torch above the compartment, and a stop command once the robot has returned the welding torch to the home position. The operator also modifies the program for the central controller by inserting a test to determine whether all of the robots have reached the designated stop points and to allow the robots to resume operation when and only when all of the robots have reached these designated stop points. This synchronizes the robots so that, at the end of each specified operation, each robot will stop and wait for the other robots to complete their respective operations. Therefore, even if a particular robot is slow, all of the other robots will stop and wait for the slower robot to complete its operation, thereby synchronizing the robots for the next stage of operation.

In the preferred embodiment, even in the single step mode of operation, the operator may command all robots to stop immediately by, for example, pressing a panic stop button on the control pendant 235. This situation will generally not occur because the amount of movement by a robot during the single step mode of operation is typically small and allows the operator to casually and carefully observe the position and direction of movement of each of the robots at the completion of each step.

In another embodiment of the present invention a timed delay is inserted into the group 2 robots so that the group 2 robots merely pause so as to allow the group 1 robots to pass first. It is also possible to simply halt the group 2 robots until the group 1 robots have reached a desired point and then permit the group 2 robots to resume operation even without stopping the group 1 robots. However, the inventors believe that the preferred way of implementing the present invention is to synchronize the operation of the robots by causing the robots to stop and wait for confirmation that the other robots have, in fact, passed through the danger area or reached a desired position, as evidenced by a signal from the other robots that such has occurred. This approach prevents a sluggish or stalled robot from causing a collision because each robot will stop at its specified position and will not resume until all of the other robots have reached their specified positions.

Figure 4:
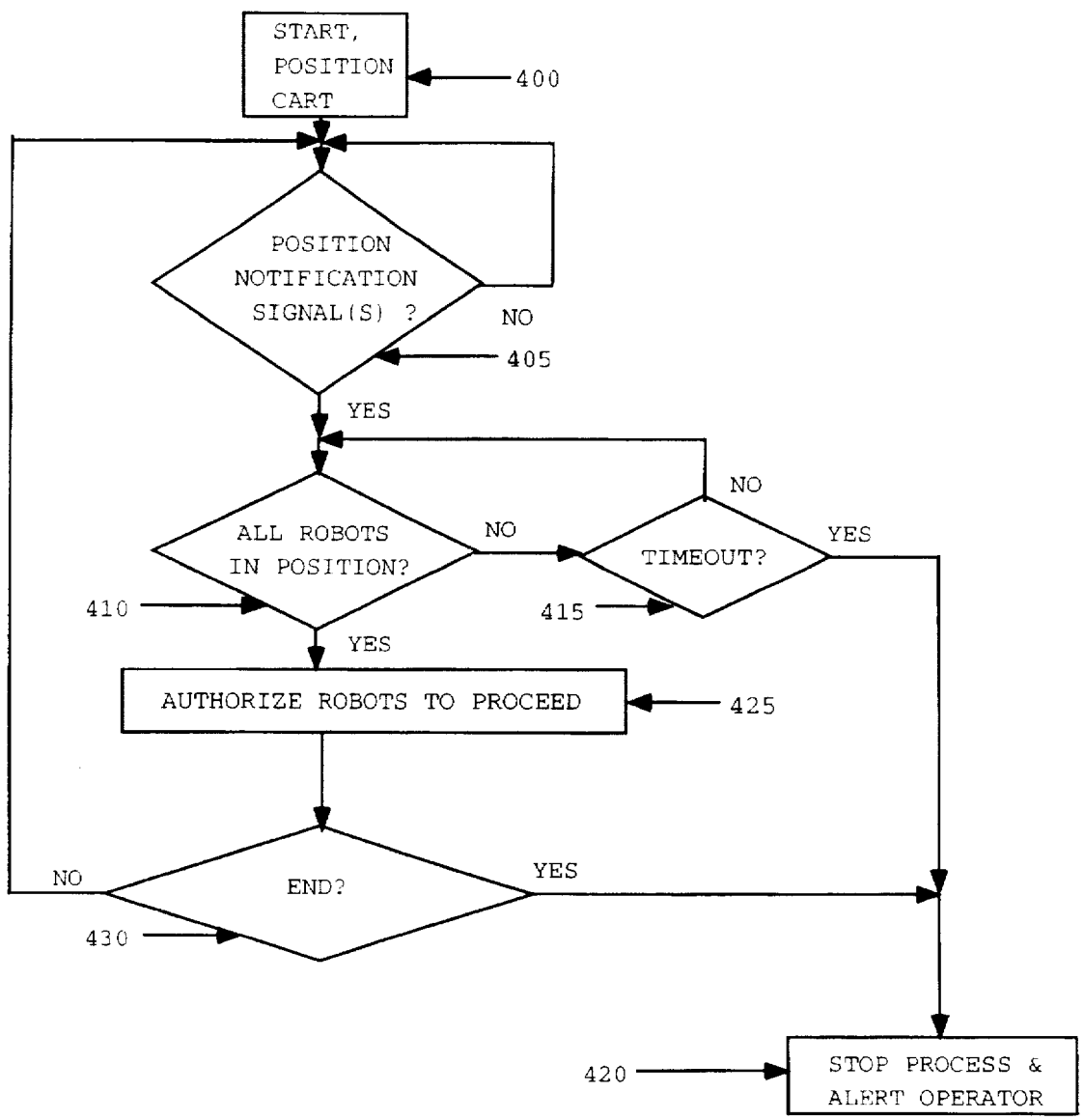
FIG. 4 is a flow chart illustrating the operation of the controller of the present invention.

Turn now to FIG. 4 which is a flowchart of the operation of the controller 230. Upon starting 400 the central controller 230 positions the workpiece by moving the cart to the selected zone. controller 230 then waits at decision 405 for the first position notification signal from the robots 100. When the first position notification signal is received then controller 230 proceeds to decision 410 where it tests whether it has received position notification signals from all of the robots, which indicates whether the rest of the robots have reached their assigned positions. The robots will move at different speeds. Also, when a robot completes a movement or an operation, the robot may close a relay or take some other action which requires a finite amount of time before it sends a position notification signal. Therefore, it is unlikely that all of the robots will simultaneously send position notification signals. Decision 415 therefore provides for a specified time for controller 230 to receive the position notification signals from all of the robots. This specified time should be sufficiently long to allow any selected group of robots to perform the specified operations while the other robots are waiting. If a timeout occurs before all of the robots have sent position notification signals then, in step 420, the controller stops the process by sending a command to each robot to stop operation, and alerts the operator that an error has occurred. An error may occur, for example, if a motor fails, or the robot is stuck, or the welding wire bonds to the workpiece. The operator can then determine the cause of the problem, correct the problem, and instruct the controller 230 to resume operation or abort the job.

If, at decision 410, all of the robots are in position before a timeout occurs then, in step 425, the controller 230 will authorize the robots to proceed.

In decision 430 the controller 230 determines whether the job has been completed. The end of a job may be indicated by a program command, by a count of the number of resume commands issued, or by a count of the number of waiting signals received, or any other convenient criteria. If the end of the job has been reached then controller 230 proceeds to step 420 where it stops the process, such as by not sending any more resume commands, and notifying the operator that the job has been ended. It will be appreciated that the number of wait signals received and the number of resume commands subsequently issued is fixed for each job and is therefore readily determined. If the end of the job has not been reached then controller 230 returns to decision 405 to wait for the next WAIT signal to occur.

For brevity, the above assumes that the robots may be divided into two groups. However, the present invention contemplates that there may be as many groups as there are robots, that is, in some situations, two robots are not permitted to move at the same time, at least until the collision zone has been safely navigated. In this situation one robot would move while all the other robots waited, then a next robot would move while all the other robots waited, and so forth, until at least some of the robots had finally reached a point where simultaneous movement was again permitted. Also, the present invention contemplates that it may take several collision avoidance routines to properly position the robots. For example, robot 1 may make a partial turn, then robot 2, then robot 3, then robot 4, and then robot 1 may make another partial turn, then robot 2, etc. Also, the present invention contemplates that the operator may have to modify the job to avoid a collision. That is, the operator may have to insert a step which causes a robot to make a movement in a direction opposite to or different from the direction needed to place the robot in position, this specific movement in this other direction being inserted to allow room for another robot to get into position, and then the first robot moving in the direction needed to place it in proper position.

Once a program is generated, or selected from a plurality of previously generated programs, then the coordinates of the seam to be welded must be determined and, if the weld is inside a compartment, the entry point into the compartment must be determined.

Determining The Weld Area

As discussed above, the present invention avoids the need for the operator to particularly specify the weld starting and stopping points. Rather, the touch-sensing feature of the robot is used to determine these points. FIG. 5 illustrates the touch sensing operation of the present invention. A corner 500 is formed by the intersection of a beam 501, a crossbar 502, and a floor plate 503. In the touch-sensing operation the robot 100, at slow speed, moves the welding torch in a first specified direction, such as downward toward floor 503. When contact is made with floor 503, which is conductive, the voltage at the torch 123 drops to zero, which indicates that one boundary is present. This coordinate is stored. Then the torch is raised slightly and moved in a second direction, such as toward beam 501. When contact is made, the second boundary is defined and this coordinate is stored. The torch is then backed up slightly from beam 502 and moved toward crossbar 502. When contact is made, the third boundary is defined and this coordinate is stored. The three boundaries thus define the three coordinates of one corner. The robot 100 then turns the torch 123 approximately 180 degrees and repeats the process to determine the boundaries and define the coordinates of the other corner. Once the coordinates of the two corners have been defined, the area to be welded has been defined. That is, the area to be welded is the line between the two coordinates. These coordinates are then used to modify the program and thereby create a new program which is peculiar to the compartment of interest. This program can then be used repeatedly for compartments identical to the one tested.

TOUCHSENSE OPERATION

| Line No. | Command | Comment |
| --- | --- | --- |
| 10 | Movel 7.5 | |
| 20 | Movel 7.5 | First determine end point of weld. Move to a spot a few inches away from the corner of the weld ending point. |
| 30 | Movel 7.5, TCHCNS = 1 (Touchsense on) | Touches X direction. |
| 35 | Movel 7.5 | Touch point and determine X coordinate. |
| 36 | Movel 7.5 | Back away from point. |
| 40 | Movel 7.5, TCHCNS = 1 | Touches Y direction. |
| 45 | Movel 7.5 | Touch point and determine Y coordinate. |
| 46 | Movel 7.5 | Back away from point |
| 50 | Movel 7.5, TCHCNS = 1 | Touches Z direction. |
| 55 | Movel 7.5 | Touch point and determine Z coordinate. |
| 56 | Movel 7.5 | Back away from point. |
| 60 | Movel 7.5, CHGPOS (Change Position) STEP 85,0 | Change position of values (Coordinates) in step 85 to those determined above. |
| 61 | Movel 7.5 | Now determine the beginning point of the weld. Move to a spot a few inches away from the corner of the weld starting point. |
| 62 | Movel 7.5, TCHCNS = 1 | Touches X direction. |
| 63 | Movel 7.5 | Touch point and determine X coordinate. |
| 64 | Movel 7.5 | Back away from point. |
| 65 | Movel 7.5, TCHCNS=1 | Touches Y direction. |
| 66 | Movel 7.5 | Touch point and determine Y coordinate. |
| 67 | Movel 7.5 | Back away from point |
| 68 | Movel 7.5, TCHCNS = 1 | Touches Z direction. |
| 69 | Movel 7.5 | Touch point and determine Z coordinate. |
| 70 | Movel 7.5 | Back away from point. |
| 71 | Movel 7.5, CHGPOS (Change Position) STEP 79,0 | Change position of values (Coordinates) in step 79 to those determined above. |
| 72 | Movel 7.5 | Back torch out to safe posidon, usually about 4 to 5 inches. |
| 79 | Movelw .61 | Using the coordinates derived in steps 62–71 as the weld start point, begin the welding operation. (Linear, using weave technique.) |
| 80 | Movelw .61 | Amplitude 1 |
| 81 | Movelw .61 | Amplitude 2 |
| 85 | Movel 7.5 | Using the coordinates derived in steps 20–56 as the weld end point, stop the welding operation. |

-continued

TOUCHSENSE OPERATION

| Line No. | Command | Comment |
|----------|---------|---------|
| 87 | Movel 7.5 | Back torch out to safe position |
| 90 | etc. | etc. |

Consider now the abbreviated robot program above which illustrates the operation of the touch-sensing feature of the present invention.

It will be noted that, in the above example, the end point is preferably determined first, and then the start point is determined. This is so that, once the determination of the points has been completed, the robot will be at the starting point of the weld. Steps 10, 20, 79 and up are the steps that one would encounter in a typical welding program, that is, steps that move the torch to a specified point and begin a welding operation. These steps are generated using programming methods such as those discussed above. However, steps 30–72 illustrate one aspect of the present invention: determining the weld area by using the touchsense feature of the robot, and changing the program accordingly.

In the prior art, touchsensing does not modify the program but simply provides an offset for starting the welding process. This offset is not stored as part of the program, nor does it modify the program itself. Thus, if the touchsensing process is used to determine the start point of a weld, but the robot is shut down, or is commanded to perform another program first, then the robot will have to perform the touchsense operation again to determine the start point of the weld. However, the present invention uses the touchsense feature along with the change position feature to actually modify the program. Thus, the stored program has the exact information necessary to perform the welding operation. Therefore, if, for example, immediately after the CHGPOS step, the robot failed or was shut down, or the operator commanded the robot to execute a different program, then the remaining steps 79 and up could be immediately executed by the robot or by a replacement robot without the need for another series of touchsensing operations.

When using this method, some of the factors that must be considered in the basic programming (steps 10, 20, 79 and up) are: the length of the compartment; the tolerances of the compartment; and obstacles, such as flanges, which may affect the torch angle or the movement or placement of the robot arm.

Preferably, initial programming is performed using the smallest compartment on the workpiece. If a larger compartment is used for the programming then, when the robot is welding a smaller compartment, then the robot may hit the wall of the workpiece before it has completed its current movel step and activated the touchsense feature. If the smallest compartment is used for the basic programming then, when the process is being used for a larger compartment, the torch will stop well before it comes near a compartment wall because the robot will not have moved the torch far enough from the entry point. However, even though the main programming leaves the torch short of the compartment wall, the touchsense feature provides for continued movement of the torch for the distance required for the torch to contact the compartment wall. Thus, the program also works for larger compartments, but only the searching distance becomes longer. Also, the touchsense programming is written to provide that the torch is approximately an inch from the wall of the smallest compartment when the touchsense feature is activated. This allows for tolerances in the placement of the elements 201 of the compartments 202. Generally, the actual placement of a part in the workpiece will be reasonably close to the specified position and an inch of tolerance searching is not required. However, the one inch search range was selected to accommodate worst case conditions.

The method described above determined the starting and ending points for a line weld. However, the present invention is also useful for determining all of the coordinates necessary to weld a compartment. In a straightforward application of the present invention, the touchsense and change position features are used twice on each corner: once to determine the starting point of one weld line; and once to determine the ending point of another weld line.

In a variation of the present invention, once the touchsense feature is used to determine the coordinates of a corner, then two change position steps are used: one for the part of a welding program which starts a weld at that corner; and one for the part of a welding program that ends a weld at that corner. Thus, the robot begins to weld around the compartment using the coordinates provided by the change position steps. If this method is used then, especially if the compartment is small, the welding program should weld on alternate or non-adjacent sides of the compartment or take other steps to avoid heat buildup in the compartment and distortion of the compartment.

Locating The Entry Point Into A Compartment

The location of the compartment or, more precisely, the point of entry into the compartment, can be determined several ways. In the preferred embodiment, coordinates are given which are close to the center of, but outside the edge of, the largest component forming the compartment. For example, if compartment 202A is the compartment of interest then beam 201B will generally be the largest component, that is, the one with the largest dimension that must be avoided by the robot. That dimension is generally the flange size. The coordinates thus given are the center of beam 201B, with respect to crossbars 201F and 201G, and the inner edge of beam 201B. These coordinates will just allow the robot 100 to enter the compartment without hitting beam 201B. This provides maximum clearance with respect to the components (201A, 201F, 201G) forming the other sides of compartment 202A.

The operator may measure these coordinates and provide same to the robot. Also, the operator may, using the touch-sensing feature of the robot, manually determine the entry point of the compartment. Another way is for the entry point coordinates to be provided from a computer-aided-design (CAD) program. In some industries, such as shipbuilding, CAD programs, such as wire-frame diagrams, are used extensively. If a CAD program was used to design the workpiece 200 then the CAD program will have information, such as the starting and ending points of the components 201, and the sizes of the components 201. This information can be used by the operator to manually determine the compartment entry points and then input these entry points into controller 230. However, in the preferred embodiment of the present invention, the CAD design program is loaded into controller 230, or controller 230 is electronically connected, such as by modem (not shown) to the computer (not shown) hosting the CAD design program. The information in the CAD design program is then selected by the operator and downloaded from the CAD design program to the controller 230. The controller 230 then uses this information to generate the entry point coordinates.

This is conveniently performed in the present invention by the operator typing in a command or using a menu to specify the type of information that will be sent to the controller 230, such as component information, compartment information, component center, or compartment center. The operator calls up a display of the wire-frame diagram, designates the compartment, and causes the information to be downloaded to the controller. The compartment may be designated by, for example, by using a mouse to point and click at the compartment, or to point and click on the members on the sides of the compartment. The operator may also visually inspect the wire-frame diagram to determine the center of the compartment, or the center of a component, and directly designate that point as the entry point.

For example, if component 201B is a T-beam having a starting point of 1.0X, 0.0Y, and a flange width of ±0.2, and components 201F and 201G are crossbars having starting points of 0.0X, and 0.0Y and 1.0Y, respectively, then it can be determined by a relatively simple computation that the center of the beam 201B, with respect to compartment 202A, is at 1.0X ((1.0+1.0)/2), 0.5Y ((0.0+1.0)/2. It is also known that the flange has a width of 0.2, so the desired interior edge of the beam 201B is at 0.8X (1.0–0.2), 0.5Y. If the arm of the robot 100 has an area such that a radial clearance of 0.1 is needed then the desired entry point into compartment 202A would be 0.7X (0.8–0.1), 0.5Y. These computations are straightforward and are preferably performed by controller 230. It will thus be appreciated that, where a CAD design is available for the workpiece being assembled, the operator need not spend large amounts of time determining the entry points into the various compartments.

The present invention also provides for taking known coordinate positions located on known planes in space and a database of established conditions to generate a program using empirical formulas. That is, if the sizes of the members 201 are known, and their positioning is known, then the entry point into the resulting compartment 202 can be readily calculated and the range of possible torch angles can be determined. Therefore, a set of programs can be established, each program providing for a different range of torch angles or compartment approach/entry steps. Then, given the particulars of a particular workpiece, the proper, optimal program for welding on that workpiece can be readily selected from the set of programs. The present invention also provides that, for a given set of component particulars (height, flange width), the size of a compartment is not a significant factor in determining which program to use. That is, the program will typically be determined by using these component particulars. However, if any of the components curves rapidly, then a program which performs touchsensing at several points will be the appropriate program. This characteristic provides for the use of standard programs to perform welding operations, and substantially reduces or eliminates the need to use a pendant to generate a welding program once the standard programs have been generated.

Typically, the compartments within a workpiece will have the same general shape, ever. though the size may vary. For example, it will be appreciated that a four-sided compartment may be a square, a rectangle, a trapezoid, or a parallelepiped. However, the use of the touchsensing feature in conjunction with the change position feature allows the same program to be used for all of these compartment types, as long as the component particulars are the same, or are nearly the same. Further, the use of the touchsensing feature, the seam tracking feature, and repeated applications of the change position feature, allow a single program to be used with compartment shapes that have curved sides. This provides for great versatility because in many cases, such as shipbuilding components, the compartments use the same members but vary in width, curvature, and angle of inclination, depending upon the location in the ship in which they are intended to be used.

In addition, once a program has been used on a particular compartment then, because the CHGPOS feature actually changes the program coordinates, the program can be saved and downloaded for future use. This saved program can then be used in the future for this type of compartment because the touchsensing feature will compensate for variations in the layout of the components. This eliminates the need to manually step through and/or generate a program, thereby providing for a substantial savings in time and efficiency.

The robots and/or controller will perform using the program selected by these known parameters, either automatically or by the operator. The method of the present invention therefore allows exact downloading of precise programming information from a CAD design into a robot and/or controller, directly or via a computer printout.

Also, a job, once loaded into either the robot or the controller, can be locally called up and activated, such as by using a pendant or a control panel on the controller, or remotely called up and activated by various means including, but not limited to, computer access via modem, via electronic switching, such as a local area network, and via cellular telephone.

Positioning The Torch

Once the robot has placed the torch inside the designated compartment, and determined the weld area coordinates, then the torch position (angle) must be set. The torch angle is important because the wrong angle will cause a poor quality weld. If the weld is along a right angle then the torch angle would preferably be 45 degrees. The job for the robot would, accordingly, specify values for the degrees of freedom and linear movements which will yield a 45 degree angle. Further, the job specifies the changes in these variables which are necessary to maintain this angle. It will be appreciated that, within a compartment, it is impossible to simply move the torch in a straight line because, although the torch may start in one corner, the robot arm will not be able to simply move along a straight line because the arm would hit a component 201 or the flange thereof as the arm approached the other corner. Therefore, the process of welding involves simultaneously linearly moving the arm and rotating the wrist so that at the end of the weld the torch is actually pointing in a direction somewhat opposite to the direction at the beginning of the weld. One can view the torch as being pulled by the arm at the beginning of the weld and pushed by the arm at the end of the weld.

However, one cannot simply specify an angle for all welding operations. The reason is that compartments are different sizes, and the flanges provide for different overhangs. Therefore, it may be physically impossible to place and/or move the torch so as to provide the optimum angle. For example, FIGS. 6A and 6B illustrate the torch in two differently shaped compartments, deep and shallow, respectively. In FIG. 6A the components 601A, 603A, and 604A form a deep compartment with a small flange 602A. The movement of the arm of robot 100 is therefore constrained and the torch 123 is, with respect to component 603A, at an angle greater than optimum. In contrast, in FIG. 6B the components 601B, 603B, and 604B form a shallow compartment, but there is a large flange 602B. The movement of the arm of robot 100 is therefore constrained and the torch 123 is, with respect to component 603A, at an angle less than optimum.

In one embodiment, the operator manually controls the torch angle during programming of the job for the particular robot. This information is then used for all compartments of similar size.

In another embodiment, the information from the CAD design program is used to determine the torch angle. The CAD program contains information on the various components shown in the wire-frame diagram, such as the height of components 601, the overhang of the flanges 602, and the distance of components 604 from components 601. In this embodiment, controller 230 obtains this information from the CAD design program. Controller 230 then uses this information to determine the range of angles that are possible and selects the degrees of freedom and linear movements that, within this range of possible angles, most closely approach the preferred angle of 45 degrees. For example, in FIG. 6B, if the overhang of flange 602B is 2.0, and the height of component 601B is 1.5, then the maximum angle of attack can be calculated, using a simple arctangent function, to be about 42 degrees for a straight-in approach. The torch 123 may have an offset, so this offset is also factored in to determine the resulting angle of attack. These computations are preferably done at each corner and at the middle of the weld area to determine the range of possible angles. Controller 230 then selects the degrees of freedom and linear movements that provide the best angle for these three points. These are then inserted into the job. For positions between these three points, the controller 230 provides that the job will linearly interpolate the degrees of freedom and linear movements between these points. Linear interpolation provides for satisfactory results while minimizing the number of calculations and program steps necessary to implement the weld.

It will be appreciated that components 604, like components 601, may also have flanges (not shown) that must be accounted for, either manually, or via data from the CAD design program.

Off-Line Programming And Program Selection

In the preferred embodiment of the present invention, a reference book of jobs is assembled. The reference book contains descriptions of welding programs for a plurality of different workpieces. The reference book preferably contains several different welding programs for each type of workpiece, so as to allow the operator to select the program that is best suited for the particular working environment (number of robots, positioning of robots, constraints on movement such as overhead beams and support columns). To assemble the reference book, programs are generated, using the methods described above, to perform the welding operation from different starting points, from different approach angles, using different approach paths, using different torch types and lengths, welding the seam in one direction and in the opposite direction, and for different types of workpiece configurations and orientations, component sizes, curvatures, and inclinations. The reference book describes the exact position of the welding torch for each move using X, Y, Z coordinates that specify the position of the torch and angle coordinates that specify the orientation of the torch. This allows the operator to visualize the operation of the robot and to select the most suitable program for the intended welding operation. In one embodiment, the information is stored on an electronically readable medium, such as tape, floppy disk, or compact disk, and displayed on a video screen at a computer terminal. If desired, each time that the operator selects and modifies a program, the modified program can be stored for future use.

Once a program has been generated for a particular type of workpiece, variations on the configuration of the workpiece, such as curvature, or inclination, can be easily accommodated by use of the touchsensing feature and the change position feature. Preferably, programs for workpieces which have curvature and/or inclination include the touchsense and change position steps so that the programs automatically compensate for variations within a type of workpiece, such as those introduced in assembly.

As an example of welding a straight line, the part to be welded is placed in a specified position with respect to a robot. A first program is generated as described above for a specified torch and a specified angle. Then the torch and robot arm are placed in a different position, for example, one that might avoid a collision problem in certain cases or with a bulky component, and the next program is generated. The torch can be placed in the same general location relative to the desired weld but the robot arm is in a different position. For example, the torch nozzle and wire may be at a 45 degree angle to the part being welded while the robot arm, or a specified part of the robot arm, may be positioned vertically or horizontally. After this program is generated, then the positioning is changed again, and another program is generated. This process is repeated until a plurality of suitable programs has been generated.

The reference book is made possible by the use of the touchsense and change position features of the present invention. If these features were not used as described herein then it would be necessary to create a new program for minor variation, no matter how trivial. The present invention therefore provides for the creation of a reference book of welding programs which are self-modifying to accommodate the particular workpiece on which the particular welding operation is being performed.

In the prior art, an operator sometimes programmed a robot by looking at a CAD screen to determine the starting and ending points of a weld and then entered an instruction which simply specified these points. However, the resulting program frequently did not work. One of the reasons is the limit switch operation of the robots. A robot can only turn so far in one direction on an axis before it reaches a limit, then it stops. If the operator did not consider this then the robot may start an operation but be unable to complete the operation because the limit on some axis was reached. This usually was not obvious to the operator and did not show up until the operator actually ran the program. The operator then had to go back and change the program, or even generate a completely new program using the pendant. The present invention avoids this problem because the generated programs have already been executed and are known to function properly.

The present invention also recognizes that merely re-using a program may not always be successful. For example, assume that a program is generated to weld a seam on a box which has the bottom of the box on a horizontal plane. Now assume that the program is used for a box which is oriented differently, for example, inclined at an angle of 45 degrees. Welding on a component which varies in orientation frequently occurs in shipbuilding environments. The program for the horizontal plane box may not work on the inclined box because the robot may not be able to use the same turns to get into position and complete the welding operation without running into a limit switch problem.

Further, the angle of the torch for the horizontal plane box may be improper for the angle of the torch for the inclined box. That is, the torch angle may be 45 degrees for the horizontal plane box. However, the molten metal will tend to run on the inclined box, thereby providing for a different weld thickness than is desired. The weld may be thinner at the top of the seam because the molten metal ran away (downhill) from the torch, and thicker at the bottom of the seam because the molten metal had accumulated there. Therefore, the angle of the torch must be varied to compensate for the inclination of the weld. The present invention therefore provides that the program used for a compartment type will vary based upon the inclination of the compartment. This is accomplished as follows.

Once programs have been generated and tested to assure their successfulness, the coordinate points can be displayed or printed out to determine a relationship between the points and the particular welding operation being performed. This empirical relationship can be expressed as a formula or equation, which can then be used to generate coordinates for other welding operations. For example, a typical coordinate value set will consist of program start point values X, Y, Z in space and a vector angle value "V" in space passing through this start point. This vector angle V is the torch orientation and is preferably in line with the electrode and the electrode torch holder. This will position the electrode and its holder so that the arc from the electrode will apply heat to the required start point. The vector angle value is preferably a composite (three angles) which is referenced to the start point specified by the X, Y, Z values. This method allows the operator to take the empirical formula derived from known, successful programs, input coordinate values from the present situation, and generate a program which will accomplish the desired welding operation without having to run the robot through the welding process to generate the program.

Further, the empirical formulas vary as the inclination of the box or compartment vary. Therefore, the empirical formulas specify the torch angle based upon the X, Y, Z values and the inclination to generate the vector angle values. Then, from the vector angle value, the desired movements can be determined. The CAD design used to generate the drawing for the part typically has the inclination information regarding a component or area and therefore the inclination information is readily obtainable by the operator from the CAD design.

For example, FIG. 8A illustrates a compartment or box on a horizontal plane, and FIG. 8B illustrates the same compartment on a different plane. In FIG. 8A, the angle of torch 123 is 45 degrees with respect to wall 801 and floor 802 of the compartment. However, in FIG. 8B, the torch angle is different because the compartment is at an angle. Therefore, the torch must be oriented so as to "push" the liquid metal into the seam 804. If the same torch angle were used in FIG. 8B as was used in FIG. 8A then the liquid metal would tend to run out of the seam 804 and/or puddle or build up on the lower side of the seam 804.

However, because the torch 123 is at a different angle, the robot may not be able to fully execute the weld on seam 804 without running into a limit on some axis. This occurs because, without proper consideration of the inclination of the compartment, the torch 123 may start at or near the limit on some axis so the robot 100 will not be able to rotate the torch 123 to maintain the proper angle. Even if there are no limit switch problems, there still may be problems with the torch angle if the inclination of the box is not considered. That is, the liquid metal may run so that the weld is too thin in some area and too thick in another area. This draws into account the experience of the CAD operator and anyone else involved in the programming. To properly program the torch angle, when considering the inclination of the compartment, requires experience in actually performing welding operations. However, most CAD operators have little or no hands on experience in welding operations and are unable to properly select the torch angle.

The present invention avoids these problems by providing for the generation of a plurality of programs, testing the programs to determine functionality, obtaining information from the programs regarding coordinates, determining a relationship between the coordinates and the workpiece characteristics, generating empirical formulas to represent this relationship, using the empirical formulas to determine certain of the welding parameters, and using these empirical formulas and welding parameters to generate a program customized for the characteristics of the particular workpiece involved. These empirical formulas are therefore derived from programs which have been tested and which do not cause limit switch problems.

According to the present invention, a program, once created, can be easily modified to accommodate changes in the work environment. For example, assume that a program was created to weld a first plate having a known shape, size and position. This program can be readily used for a second, similar plate, which is in a different position. For example, assume that the second plate is two feet to the left of the position for the first plate. The operator can cause controller 230 to display or print out the program for the first plate, which may include controller 230 calling the program from a robot 100 if the program is not stored in controller 230. The display will show the coordinates at every step in the program. The operator will know that the general movement of the robot arm for the second plate should be the same as the general movement of the robot arm for the first plate, so the operator creates the second program by modifying the coordinates to shift the position of the robot arm two feet to the left. This is done for every point. Therefore, the second program has been created off-line, that is, without the need for actually moving the robot through the different steps. After the operator generates the second program, the operator preferably steps or runs the robot through the second program to verify that the desired result has been achieved.

As disclosed herein, in one embodiment of the present invention, information regarding component and compartment size and position are extracted from a CAD program on another computer. However, there are different types of CAD programs and the information may not be in a usable form in some of the CAD programs. Therefore, in another embodiment of the present invention, the CAD drawing 1201 of the component 200 or compartment is printed out. FIG. 12 illustrates this method of off-line programming of the robots. Preferably, the drawing is printed out at a specified scale, such as 1 inch equals 1 foot, 1 centimeter equals ten centimeters, etc. Then, a transparency 1202 is created which shows the movements 1203A–1203D of the robots 100A–100D, respectively, with respect to the travel path of the cart. The transparency 1202 is then placed over the scaled drawing 1201 and the offset coordinates for the particular component/compartment are determined by the operator by visual inspection. The operator then inserts these offset coordinates into the program. Although this method may not be as precise as directly downloading the information from a CAD program, it provides information which is satisfactory because the touchsense and the change position features of the present invention readily compensate for any minor errors. This method can also be used for determining zones so that one can also program and print out the cart movement and use the transparency to determine if a particular cart movement will place the workpiece in the proper position for welding.

Tracking The Weld Seam

Once the robot starts welding then there is no problem if the weld seam is to be a straight line. However, there is a problem if the weld track is curved. Conventional welding programs merely provide for point-to-point welding. Of course, a curve could be represented as a series of point-to-point welds but the present invention provides a better method of controlling the weld. The specified robots provide a seam tracking feature. When using the seam tracking feature the robot dithers, or oscillates, the torch as the weld is being performed. This is done by changing at least one of the degrees of freedom of the wrist of the robot in a periodic manner. The particular degree(s) varied in this manner will depend upon the angle of attack of the torch 123 and the path (horizontal or vertical) to be taken. FIGS. 7A and 7B illustrate the seam tracking process for various types of welds. Two components 701 and 702 are being joined together at seam or inside corner 703 fillet weld. The path of torch 123 is shown as dotted line 704, which is exaggerated for clarity of explanation. An arc welding power supply 710 in the robot 100 provides the arc current. A current monitor 711, also part of robot 100, monitors the arc current provided by power supply 710. The microprocessor controller 712 in robot 100 controls the operation of robot 100, including power supply 710, and obtains the current readings from monitor 711. The arc current is measured during the welding/dithering process at the deviation peaks 705A and 705B. If the torch is centered on the corner 703 then, at the peaks 705A the torch will be at the same distance from component 701 as the distance from component 702 at peaks 705B. Therefore, the current at peaks 705A and the current at peaks 705B should be the same. However, if the torch is not at the center of the corner 703 then the arc currents will be different. For example, assume that the torch is slightly biased to the component 701 side of the corner. Then, because the torch is closer to component 701 and the arc distance is shorter, the arc current will increase. Therefore, the arc current at peaks 705A will be greater than the arc current for peaks 705B. The arc current measurements for peaks 705A are accumulated on a sliding window of, for example 10 measurements, and the arc current measurements for peaks 705B are accumulated on another sliding window. These cumulative measurements are compared. If torch 123 is off of corner 703 in favor of component 701 then the cumulative current for peaks 705A will be higher than the cumulative current for peaks 705B. Accordingly, the robot 100 will move its arm so as to move torch 123 more toward component 702. Conversely, if torch 123 is off of corner 703 in favor of component 702 then the cumulative current for peaks 705B will be higher than the cumulative current for peaks 705A. Accordingly, the robot 100 will move its arm so as to move torch 123 more toward component 701. This feature of the built in seam tracking system allows the robot to track the seam 703.

However, this built-in seam tracking feature has generally been found to be wanting when used for a weld other than a fillet weld. This arises because the characteristics of these other welds are different than the characteristics of the fillet weld. Consider, for example, a standard edge weld on edge 714 of component 701. The edge weld should be on the center line 715 of edge 714. Assume that the torch 123 drifts toward the facing side of component 701. The current at the deviation peaks 716A will be greater than the current at the deviation peaks 716B. The built-in seam tracking feature would cause the torch 123 to move away from the higher current peaks and toward the lower current peaks, thus bringing the torch 123 toward the facing side of component 701, thereby exaggerating the drift until the torch 123 was finally moved completely off of edge 714.

Next consider an edge buttering weld, which would be placed along center line 721 in area 720 of component 702. Assume that the torch 123 drifts toward the edge 723 of component 702. The current at the deviation peaks 722A will be greater than the current at the deviation peaks 722B. The built-in seam tracking feature would cause the torch 123 to move away from the higher current peaks and toward the lower current peaks, thus bringing the torch 123 toward the edge 723 of component 702, thereby exaggerating the drift until the torch 123 was finally moved completely off of the desired area 720.

Next, consider the case of an outside corner weld, as shown in FIGS. 7B and 7C. Components 701 and 702 are joined at an angle and a weld is to be placed along corner or seam 731 at the junction of the components. If the torch 123 drifts toward component 702 (or component 702 is curved into the page) then the arc distance will be increased for deviation peaks 732B, and therefore the current at peaks 732B will be less than the current at peaks 732A. The torch 123 is intended to follow the path of seam 731. However, the built-in seam tracking feature would cause the torch 123 to move away from the higher current peaks and toward the lower current peaks, thus bringing the torch 123 further over component 702, thereby exaggerating the drift until the torch 123 was finally moved completely off of the desired seam 731.

The tracking function of the present invention is opposite of the built-in seam tracking function. The built-in seam tracking function instructs the robot to move the torch in the direction of the lower current peaks. The present invention instructs the robot to move the torch in the direction of the higher current peaks. The operator knows the type of weld that is to be made when the operator is programming the robot or selecting a program for the robot. Therefore, in the preferred embodiment, the operator also selects the type of weld (fillet, standard edge, buttering edge, outside corner), or the tracking function (move toward lower current, move toward higher current) appropriate for the particular components to be joined together. A sliding window of ten current measurements is used in the preferred embodiment.

This feature of the present invention is useful for placing a bead weld on an edge or outside corner weld. Referring again to FIG. 7A, suppose that it is desired to place a bead on the edge of component 701 in the area designated as 714. The torch would follow path 717, exaggerated for clarity of illustration, along center line 715, along edge 714, measuring the current at the peaks 716A, 716B of the travel path 717. If the torch deviates toward the facing side of component 701 then the peak current measured at the deviation peaks on this facing side will be less than the current measured at the deviation peaks on the opposite (hidden) side. Robot 100 will then move its arm so as to move torch 123 away from the lower current side (the facing side of component 701), and toward the hidden side of component 701, thus restoring the current balance and thereby repositioning torch 123 along the center line 715 of edge 714.

The angle of torch 123 with respect to the workpiece is important and, if improper, can cause the torch to be moved with respect to deviation from the desired seam or centerline in a direction influenced by the torch angle. Preferably, the angle of torch 123, as viewed from the side of centerline 715, is 90 degrees. If the torch is angled so as to point toward the direction of movement (whether from front to back, or from side to side) then this is called a leading weld and if the torch is angled so as to point opposite the direction of movement then it is a lagging weld. A leading weld tends to push the liquid metal in the direction of movement, thus providing for a higher workpiece height (including the liquid metal), a reduced arc length, and a higher arc current. A leading weld also penetrates less into the base metal (workpiece), pulls the liquid metal away from the area that was just welded, and thus provides a smoother welded surface (lower crown) than a lagging weld. A lagging or dragging weld tends to cut deeper into the workpiece, pulls the liquid metal away from the direction of movement, pushes the liquid metal back toward the area that was just welded, and thus has a rougher surface (more of a crown) than a leading weld. Thus, the use of a leading weld or a lagging weld affects the height of the torch with respect to the workpiece (which includes the liquid metal at this point), affects the arc length, and thereby affects the arc current. Thus, the use of a leading weld or a lagging weld is important for providing the desired surface finish and for controlling the seam tracking.

Consider, for example, the angle of torch 123, as viewed along centerline 715. If the torch 123 is tilted so as to point toward deviation peaks 716A then the torch 123 tends to push the liquid metal toward the deviation peaks 716A and away from deviation peaks 716B. This makes the metal at deviation peaks 716A higher than the metal at deviation peaks 716B, thus the arc distance at deviation peaks 716A is less than the arc distance at deviation peaks 716B. Accordingly, the arc current at deviation peaks 716A will be greater than the arc current at deviation peaks 716B, and so the robot controller will tend to move the torch 123 in the direction of the greater current, that is, toward deviation peaks 716A. Thus, the movement of torch 123 with respect to the desired seam or centerline can be controlled by adjusting the angle of the torch and can also be used to offset torch movement with respect to the desired seam or centerline that might be caused by a tilt in the workpiece, and torch movement with respect to from the desired seam or centerline that might be caused by different conductivity characteristics within a workpiece. The proper angle of torch 123 for a particular case is determined by experimentation.

Consider now the application of the present invention to the process of placing a buttering weld. Referring again to FIG. 7A, suppose that it is desired to place the bead for the buttering weld in the area 720 on the edge of component 702. The torch would follow path 724, exaggerated for clarity of illustration, along center line 721, measuring the current at the peaks 722A, 722B of the travel path 724. If the torch deviates toward the edge 723 of component 702 then the peak current measured at the deviation peaks closer to this edge 723 will be less than the current measured at the deviation peaks away from edge 723. Robot 100 will then move its arm so as to move torch 123 away from the lower current side (edge 723), and toward the center of component 702, thus restoring the current balance and thereby repositioning torch 123 along the center line 721 of area 720.

The angle of torch 123 with respect to the workpiece is also important for edge buttering welds and, if improper, can cause the torch to be moved in an undesired direction with respect to the desired seam or centerline. Preferably, the angle of torch 123, as viewed from the side of centerline 721, is 90 degrees. Again, the angle of torch 123, as viewed along centerline 721, does affect the seam tracking. If the torch 123 is tilted so as to point toward deviation peaks 722A then the torch 123 tends to push the liquid metal toward the deviation peaks 722A and away from deviation peaks 722B. This makes the metal at deviation peaks 722A higher than the metal at deviation peaks 722B, thus the arc distance at deviation peaks 722A is less than the arc distance at deviation peaks 722B. Accordingly, the arc current at deviation peaks 722A will be greater than the arc current at deviation peaks 722B, and so the robot controller will tend to move the torch 123 in the direction of the greater current, that is, toward deviation peaks 722A and away from deviation peaks 722B and edge 723. Thus, the movement of torch 123 with respect to the desired seam or centerline can be controlled by adjusting the angle of the torch and can also be used to offset torch movement with respect to the desired seam or centerline that might be caused by a tilt in the workpiece, and torch movement with respect to from the desired seam or centerline that might be caused by different conductivity characteristics within a workpiece. Again, the proper angle of torch 123 for a particular case is determined by experimentation.

Consider now the application of the present invention to the process of laying a bead along the outside corner junction of component 702. The torch would follow along edge 731, measuring the current at the peaks 732A, 732B of the travel path 733. If the torch deviates toward component 702 then the peak current measured at the deviation peaks on this facing side will be less than the current measured at the deviation peaks on the component 701 side. Robot 100 will then move its arm so as to move torch 123 away from the lower current side (component 702), and toward the higher current side (component 701), thus restoring the current balance and thereby repositioning torch 123 along the center line 731.

In all cases, the torch angle and the torch height with respect to the workpiece are important. If the workpiece is tilted then the surface of the workpiece at the deviation peaks on one side will be higher than the surface of the workpiece at the deviation peaks on the other side. Accordingly, the arc length will be smaller and, therefore, the arc current will be greater than the arc length and the arc current, respectively, on the other side. Therefore, the torch will tend to move toward the larger arc current, the higher side and the torch will be pulled off of the desired path. In the present invention, any known tilt in the surface of the workpiece is compensated for by tilting the torch to match.

Some robots, as originally built by a manufacturer, have a tendency to drift toward one side or the other of the centerline. This can be compensated for by adjusting the torch angle to balance out the tendency to drift, and/or by providing for a higher torch height on one side (e.g., 1/32 inch or 0.8 millimeter higher on deviation peaks 716A) than on the other side (e.g., deviation peaks 716B). The amount of torch angle or height variation necessary is machine dependent and is determined by experimentation.

If the part curves too rapidly then the seam tracking technique described above may respond too slowly. The present invention therefore provides that, in addition defining the starting and ending points of a weld, the change position feature is used to define points within a weld. More particularly, the welding program is modified so that, rather than providing only two points for a weld, the welding program for a line is broken into a series of smaller welds. The program therefore provides that, periodically, the welding operation will stop and the robot will perform a touch-sense operation, followed by a CHGPOS step. This brings the robot torch exactly back on the seam. In the preferred embodiment, the smaller welds are about five inches long, but smaller or larger distances may be used, depending upon how rapidly the workpiece curves. Between touch points, the arc sensing feature is used. Thus, the present invention provides for maintaining a welding seam on the proper path by using the touchsensing feature with the change position feature, and by using the arc current to maintain the welding seam on the proper path, and by using all of these features on the same curved weld. Also, rather than interrupting the welding process to perform the touchsense and change position operations, the touchsense and change position operations are preferably performed for the entire welding path before the welding process is started. This provides for an uninterrupted welding process.

In situations where the plates are butted tightly together in the same plane the difference in the currents at the peak deviations may be inadequate to properly track the seam or joint. Therefore, in addition to the above methods for tracking a seam, or joint, the present invention also provides another method for seam tracking. This method further provides for better control over the welding process. To yield the best results, the robot should be able to determine certain characteristics of the workpiece and act according to those characteristics. If two plates are tacked together but are not cut precisely, or one plate is warped, then the plates may fit together exactly at the ends, but leave a crack between the plates in the center. If the crack is small then the robot can compensate for this by moving more slowly and/or weaving (dithering) slightly more so that more welding material is deposited at the crack and fills in the crack. If the crack is too large then the robot can stop the welding process and notify the operator. The operator can then determine the appropriate action to take. The present invention therefore provides for the use of a plurality of infrared emitters and detectors to determine the characteristics of the workpiece.

FIG. 9 is an illustration of a workpiece monitoring device according to the present invention. Plates 901 and 902 are being joined together. For simplicity of illustration, only two emitters 903A and 903B and two detectors 904A and 904B are shown. It will be appreciated that the use of more emitters and detectors provides for more information and increased resolution. In the preferred embodiment Emitters 903 and detectors 904 are mounted by any convenient means to the "gooseneck" of the robot 100 and are inclined at an angle with respect to the welding wire 123. Each emitter-detector (903A and 904A, 903B and 904B) combination is set for a different operating frequency. This is accomplished by adjusting the pulse frequency of the driver 905 for an emitter 903 to be different than the pulse frequency of the driver 905 for any other emitter. For example, driver 905A would have a different pulse frequency than driver 905B. Also, the output of each detector 904 is connected to its respective bandpass filter circuit 906, which is tuned to the same frequency as the driver circuit 905 for the corresponding emitter 903. A phase-locked loop can also be used for circuit 906. The design and construction of tunable drivers and bandpass filters are well known and need not be repeated here. The outputs of filters 906 are connected to robot 100 or, preferably, controller 230. The use of different pulse frequencies prevents interference among the several emitter 903-detector 904 pairs.

Consider now the operation of this feature. If the torch is centered over the seam, and is not at an angle with respect to the seam, then the energy transmitted by the emitters and reflected by the plates to the detectors should be the same, or approximately so. If the torch 123 is canted at an angle then the emitters and detectors will also be canted at an angle and the reflected energies will not be equal. If the reflected energies (as detected by diodes 904A and 904B) differ by more than a predetermined amount (to account for normal reflectivity variations in the plates 901, 902) then the controller 230 (or the robot 100) takes action to correct the cant of the welding torch 123. The action is taken until the relected energies are within the predetermined tolerance range. To prevent the welding arc from influencing the operation of this feature appropriate, commercially available filters (not shown) are placed over the detectors 904.

This method can be enhanced by using more emitters and detectors on the sides of the welding torch 123 as well as in front of and behind (to allow movement in either direction) of the welding torch 123. For example, if additional detectors (not shown) are added which extend further out from the sides of welding torch 123 then a crack can be detected because the reflected energies for the inner set of emitters and detectors will drop down with respect to the reflected energies for the outer set of emitters and detectors because less energy will be reflected by the crack than will be reflected by the adjacent plates 901, 902. Similarly, if the reflected energies for all the emitters and detectors drops off then this is an indication that the end of the workpiece has been reached or that a very large crack between the plates has been encountered. In this event, controller 230 would terminate the welding operation, notify the operator, or take some other predetermined action.

This same arrangement can also be used to inspect the compartment or object to be welded before the welding operation is started. Once the dimensions and coordinates of the compartment and the angles for the welding torch have been determined, the robot 100 will proceed through the welding operation movements without activating the torch 123. Problems can thus be detected and the operator alerted before the welding process so that the operator can determine what, if any, corrective action should be taken before the welding process is started.

This same arrangement can also be used to inspect the compartment or object to be welded to determine the size and shape of the compartment, where the edge of the workpiece is located, etc.

Although the detector and emitter for a detector-emitter pair are shown on opposite sides of the torch 123, this is not a requirement for operation and the detector and emitter may be placed in a different orientation, such as beside each other on the same side of the torch.

It is also possible to mount detector-emitter pairs looking radially outward from the torch. Preferably, the pairs are spaced at 90 degree intervals around the torch but other intervals, and irregular intervals, may also be used. The detector-emitter pairs may be fastened to the torch 123 by any convenient means. For example, the detector-emitter pairs may be mounted on or in a cylinder or sleeve which fits around the arm of robot 100 just above the torch 123. These radially-looking pairs provide information regarding the orientation of the torch 123 with respect to the walls of the compartment in which torch 123 is operating, or with respect to the some other component, such as component 701 of FIG. 7A. These radially-looking pairs are also used to maintain the torch orientation and may be also be used as proximity detectors to notify the robot 100 or the controller 230 that a wall or component is being approached so that the torch 123 may be stopped or its direction changed.

Universal Programming

One problem that might occur when trying to download a program into a robot controller might be that the robot manufacturer has decided not to publish any information regarding the internal workings and programming of the robot. This presents a problem because the program instructions may not be properly understood by the robot, if understood at all.

The present invention solves this problem by providing a mechanism which is installed over the pendant 135 for the robot 100. FIG. 10 illustrates the universal programming mechanism. The mechanism 1000 has a plurality of solenoids 1001A–1001P. These solenoids are arranged so that the solenoids 1001A–P are over the buttons 135AA–135AP, respectively, of the pendant 135 when the mechanism 1000 is placed over and fastened to the pendant 135. Fastening of the mechanism to the pendant may be accomplished by any number of standard techniques in the art. The controller 230 would then implement the desired program by activating the appropriate solenoids 1001A–P so as to cause the appropriate buttons 135AA–135AP on pendant 135 to be pushed at the proper time. For example, to position the robot arm, the controller 230 would activate solenoid 1001B which would press button 135AB on pendant 135 to instruct the robot to move the arm in a certain direction at a certain speed until a specified point had been reached. When the robot indicated, by signal or LED display, or other means, that the command had been executed, then controller 230 would deactivate solenoid 1001B and possibly activate solenoid 1001P to cause the robot 100 to store the coordinates of the point that had been reached. This process is repeated until the controller 230 has programmed the robot 100 for the desired welding operation. In a similar manner, controller 230 can cause the robot 100 to recall a previously stored program position co the program, or use change position commands to modify the program.

A different assembly 1000 can be made for each different type of pendant 135. Thus the present invention is useful with a plurality of different robot types. Although the assembly/mechanism 1000 is shown as fitting over the pendant 135, other methods of providing functional connectivity between assembly/mechanism 1000 and pendant 135 are also possible. For example, the assembly/mechanism 1000 may be formed as a box, with an open end, so that the pendant 135 may be inserted into the box.

Bar Codes For Welding And Compartment Designation

When a robot enters a compartment or some other area to perform a welding process the robot must already have been instructed what the welding process should be. Some details may have been omitted because they can be provided by the touchsense and change position features. However, the basic information must be there.

The present invention provides for using bar codes to convey information regarding the weld. Bar codes are well known and are not described in detail herein. FIG. 11 illustrates the use of bar codes for programming the robots. The robot 100 would have a bar code scanner 1110 near the welding torch 123. The bar code scanner may be affixed to the arm of the robot 100 in any convenient manner. For example, the bar code scanner could be mounted on a plate which is attached to the gooseneck, such as is illustrated for the infrared sensors in FIG. 9. In one embodiment, the robot 100 enters a compartment and scan for the bar code 1101, and reads the information from the bar code 1101. The bar code is preferably printed on a label with an adhesive backing which will stick to the workpiece. The bar code 1101 contains information regarding the particular weld to be performed, such as the starting and ending points of the weld, or whether one or all of the corners of a compartment are to be welded, which corner is to be welded, the welding voltage and current, the type of gas, the torch angle to be used, the type of welding to be done (MIG, TIG, etc.) or whether welding or cutting is to be done, the welding program(s) to be used, etc. This information is then used by the controller 230 or the robot 100 to set up the welding operation.

In another embodiment, an operator places bar codes 1102 and 1103 containing the information at the starting and ending points, respectively, of the weld. Bar code scanners 1110 work over a substantial distance and therefore the bar code need not be placed exactly at the weld but a bar code 1104 can be simply placed near the weld, such as at an entrance to the compartment 202F. The robot 100 or the controller 230 has a scanning program which causes the torch 123, and therefore the bar code scanner 1110, to move in a predetermined pattern (such as back and forth) over the workpiece so that the bar code scanner 1110 can scan the entire surface of the workpiece and read any bar codes 1101. This allows the robot 100 or the controller 230 to read the bar codes without the operator having to select a welding program which is appropriate to get into a compartment so that the bar code scanner 1110 can read any bar codes in the compartment. Rather, the bar code labels are placed on the top surface where they can be easily scanned, and the labels contain information as to which program should be used to scan or weld within the compartment.

In an alternative embodiment of the present invention, the programs are stored in the controller 230, rather than in the robots 100. Then, when a job is to be performed, the controller 230 downloads the appropriate programs to the robots 100. This allows for a larger number of programs to be stored because, by using commercially available hard disk drives, the number of different jobs and programs which can be stored is essentially unlimited. Of course, a larger disk drive could be installed in a robot but this may void the manufacturer's warranty, and the robot firmware program may not accommodate the increased memory size.

Although the present invention has been described with particularity with respect to its preferred environment, the present invention is not limited to welding operations. The present invention is also useful for cutting objects, and for picking and placing objects which may not have a precisely known position or a precisely known orientation. The orientation of the object to be moved is equivalent to the orientation of the welding torch in a welding or cutting environment.

It will be appreciated from the above that the present invention provides a method which prevents collisions between robots which are operating in the same area, especially those robots operating on the same workpiece. The method of the present invention works with existing robot welders, does not require modifications to the robots, and does not require expensive computer programs, which may not even be available for the type of processor used in a particular robot.

It will also be appreciated from the above that the present invention provides a method for specifying a compartment entry point for a welding operation based upon data provided from a CAD program.

It will also be appreciated from the above that the present invention provides a method for automatically determining the starting and ending coordinates of a weld.

It will also be appreciated that the present invention provides a method for automatically determining the position of a torch to provide for an optimum angle of attack for a welding operation.

It will also be appreciated from the above that the present invention provides a method for automatically tracking the joint for a welding seam.

It will also be appreciated from the above that the present invention provides a method for automatically tracking the edge of a component for applying a welding bead to the edge.

It will also be appreciated from the above that the present invention provides for using data provided from a CAD program to select the welding program to be used for welding in a compartment.

It will also be appreciated from the above that the present invention provides for storing a plurality of welding programs in a central controller and downloading the appropriate program for a welding operation to the robots.

It will also be appreciated from the above that the present invention provides for establishing a set of standard programs and using the component particulars to select the standard program to be used for the welding operation.

Also, even though the present invention has been described with particularity with respect to welding operations, it will be appreciated that the present invention is also applicable to other types of operations, such as cutting, burning, gouging, filling out seams, etc.

From a reading of the description above of the preferred embodiment of the present invention, modifications and variations thereto may occur to those skilled in the art. Therefore, the scope of the present invention is to be limited only by the claims below.

We claim:

1. A method for programming a first robot and a second robot to avoid collisions between said robots, comprising the steps of:

specifying a desired zone of operation for said first robot and a desired zone of operation for said second robot;

developing a job for each of said robots, said jobs instructing said robots how to reach said desired zones;

simultaneously stepping said first robot and said second robot through respective said jobs;

visually observing said robots as said robots are stepped through said respective jobs;

manually inserting stop points in said jobs as necessary to prevent a collision between said robots;

specifying resume conditions for said stop points;

storing said jobs with said stop points; and authorizing said robots to begin execution of said jobs.

2. The method of claim 1 wherein said step of specifying resume conditions comprises specifying completion of a specified movement by another robot.

3. The method of claim 1 wherein said step of specifying said zone of operation for a said robot comprises specifying an area where said robot is to perform a specified process.

4. The method of claim 1 wherein said step of specifying said zone of operation for a said robot comprises specifying an area where said robot is to perform a welding operation.

5. A method of operating a first robot and a second robot to avoid a collision between said robots, comprising the steps of:

authorizing said first robot to begin execution of a first predetermined procedure, said first predetermined procedure having a plurality of stop points;

authorizing said second robot to begin execution of a second predetermined procedure, said second predetermined procedure having a plurality of stop points;

receiving a signal that said first robot has reached a predetermined stop point in said first predetermined procedure;

receiving a signal that said second robot has reached a predetermined stop point in said second predetermined procedure;

authorizing said first robot to proceed to a next predetermined stop point in said first predetermined procedure;

waiting for a signal that said first robot has reached said next predetermined stop point;

receiving said signal that said first robot has reached said next predetermined stop point; and authorizing said second robot to proceed to a next predetermined stop point in said second predetermined procedure.

6. The method of claim 5 and further comprising the steps of:

waiting for a signal that said second robot has reached said next predetermined stop point;

receiving said signal that said second robot has reached said next predetermined stop point; and authorizing both said first robot and said second robot to simultaneously proceed to subsequent stop points.

7. A method for programming a first robot and a second robot to avoid collisions between said robots, comprising the steps of:

specifying a desired zone of operation for said first robot and a desired zone of operation for said second robot;

developing a job for each of said robots, said jobs instructing said robots how to reach said desired zones;

visually identifying critical points in said jobs;

manually inserting a stop point at each said critical point in said jobs;

specifying resume conditions for said stop points;

storing said jobs with said stop points; and authorizing said robots to begin execution of said jobs.

8. The method of claim 7 wherein said step of specifying resume conditions comprises specifying that both said robots have reached specified points.

9. The method of claim 7 wherein said step of specifying resume conditions comprises specifying completion of a specified movement by another robot.

10. The method of claim 7 wherein said step of specifying said zone of operation for a said robot comprises specifying an area where said robot is to perform a specified process.

11. The method of claim 7 wherein said step of specifying said zone of operation for a said robot comprises specifying an area where said robot is to perform a welding operation.

12. A method of operating a first robot and a second robot to avoid a collision between said robots, comprising the steps of:

authorizing said first robot to begin execution of a first predetermined procedure, said first predetermined procedure having a plurality of stop points;

authorizing said second robot to begin execution of a second predetermined procedure, said second predetermined procedure having a plurality of stop points;

receiving a signal that said first robot has reached a predetermined stop point in said first predetermined procedure;

receiving a signal that said second robot has reached a predetermined stop point in said second predetermined procedure; and authorizing both said first robot and said second robot to simultaneously proceed to next stop points.

13. A method of programming a robot to avoid distortion of an object, said robot having a program for performing a plurality of operations on said object, said method comprising:
    determining the location on said object of a first operation to be performed;
    determining the location on said object of a second operation to be performed;
    determining the location on said object of a third operation to be performed;
    determining whether said first location is sufficiently close to said second location that performance of said first operation and said second operation consecutively will cause distortion of said object; and
    if said performance will cause said distortion then altering said program to cause said robot to perform said third operation between performance of said first operation and performance of said second operation.

14. A method of programming a first robot and a second robot to avoid distortion of an object, each said robot having a program for performing a plurality of operations on said object, said method comprising:
    determining a first location on said object of a first operation to be performed by said first robot;
    determining a second location on said object of a second operation to be performed by said second robot;
    determining whether said first location is sufficiently close to said second location that simultaneous performance of said first operation and said second operation will cause distortion of said object; and
    if said simultaneous performance will cause said distortion then altering said program of said first robot to cause said first robot to perform a third operation while said second robot is performing said second operation.

15. A method of programming a first robot and a second robot to avoid distortion of an object, each said robot having a program for performing a plurality of operations on said object, said method comprising:
    determining a first location on said object of a first operation to be performed by said first robot;
    determining a second location on said object of a second operation to be performed by said second robot;
    determining whether said first location is sufficiently close to said second location that simultaneous performance of said first operation and said second operation will cause distortion of said object; and
    if said simultaneous performance will cause said distortion then altering said program of said first robot to cause said first robot to perform an operation at a third location while said second robot is performing said second operation.

16. A method of programming a first robot and a second robot to avoid distortion of an object, each said robot having a program for performing a plurality of operations on said object, said method comprising:
    determining a first location on said object of a first operation to be performed by said first robot;
    determining a second location on said object of a second operation to be performed by said second robot;
    determining whether said first location is sufficiently close to said second location that consecutive performance of said first operation and said second operation will cause distortion of said object; and
    if said consecutive performance will cause said distortion then altering said program of said first robot to cause said first robot to perform a third operation after said second robot has performed said second operation, and to cause said first robot to perform said first operation after said first robot has performed said third operation.

17. A method of programming a first robot and a second robot to avoid distortion of an object, each said robot having a program for performing a plurality of operations on said object, said method comprising:
    determining a first location on said object of a first operation to be performed by said first robot;
    determining a second location on said object of a second operation to be performed by said second robot;
    determining whether said first location is sufficiently close to said second location that consecutive performance of said first operation and said second operation will cause distortion of said object; and
    if said consecutive performance will cause said distortion then altering said program of said first robot to cause said first robot to perform a third operation at a third location after said second robot has performed said second operation, and to cause said first robot to perform said first operation after said first robot has performed said third operation at said third location.

* * * * *